(12) United States Patent
Mishaeli et al.

(10) Patent No.: US 9,519,324 B2
(45) Date of Patent: Dec. 13, 2016

(54) LOCAL POWER GATE (LPG) INTERFACES FOR POWER-AWARE OPERATIONS

(71) Applicants: Michael Mishaeli, Zichron Yaakov (IL); Ron Gabor, Hertzliya (IL); Robert C. Valentine, Kiryat Tivon (IL); Alex Gerber, Haifa (IL); Zeev Sperber, Zichron Yackov (IL)

(72) Inventors: Michael Mishaeli, Zichron Yaakov (IL); Ron Gabor, Hertzliya (IL); Robert C. Valentine, Kiryat Tivon (IL); Alex Gerber, Haifa (IL); Zeev Sperber, Zichron Yackov (IL)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 14/225,612

(22) Filed: Mar. 26, 2014

(65) Prior Publication Data

US 2015/0277532 A1 Oct. 1, 2015

(51) Int. Cl.
*G06F 1/32* (2006.01)
*G06F 9/22* (2006.01)

(52) U.S. Cl.
CPC .......... *G06F 1/3206* (2013.01); *G06F 1/3287* (2013.01); *G06F 9/22* (2013.01)

(58) Field of Classification Search
CPC ........ G06F 1/3287; G06F 1/3206; G06F 9/22; G06F 9/223; G06F 9/24; G06F 9/226; G06F 9/224; G06F 9/261; G06F 9/264; G06F 9/3897; G06F 9/30181; G06F 9/30076; G06F 9/30189
See application file for complete search history.

(56) References Cited

U.S. PATENT DOCUMENTS

| | | | | |
|---|---|---|---|---|
| 8,543,796 | B2 * | 9/2013 | Falik | G06F 9/30032 712/208 |
| 8,589,665 | B2 * | 11/2013 | Carter | G06F 1/3203 712/229 |
| 2013/0081043 | A1 * | 3/2013 | Glew | G06F 9/5027 718/104 |

* cited by examiner

*Primary Examiner* — Kim Huynh
*Assistant Examiner* — Siamak S Hefazi
(74) *Attorney, Agent, or Firm* — Lowenstein Sandler LLP

(57) ABSTRACT

Technologies for local power gate (LPG) interfaces for power-aware operations are described. A processor includes locally-gated circuitry of a core, main core circuitry of the core, the main core, and local power gate (LPG) hardware. The LPG hardware is to power gate the locally-gated circuitry according to local power states of the LPG hardware. The main core decodes a first instruction of a set of instructions to perform a first power-aware operation of a specified length, including computing an execution code path for execution. The main core monitors a current local power state of the LPG hardware, selects one of the code paths based on the current local power state, the specified length, and a specified threshold, and issues a hint to the LPG hardware to power up the locally-gated circuitry and continues execution of the first power-aware operation without waiting for the locally-gated circuitry to be powered up.

20 Claims, 14 Drawing Sheets

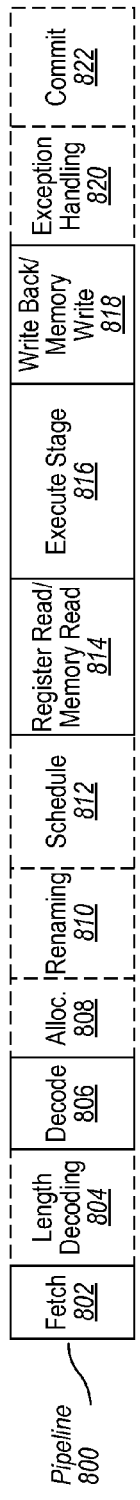
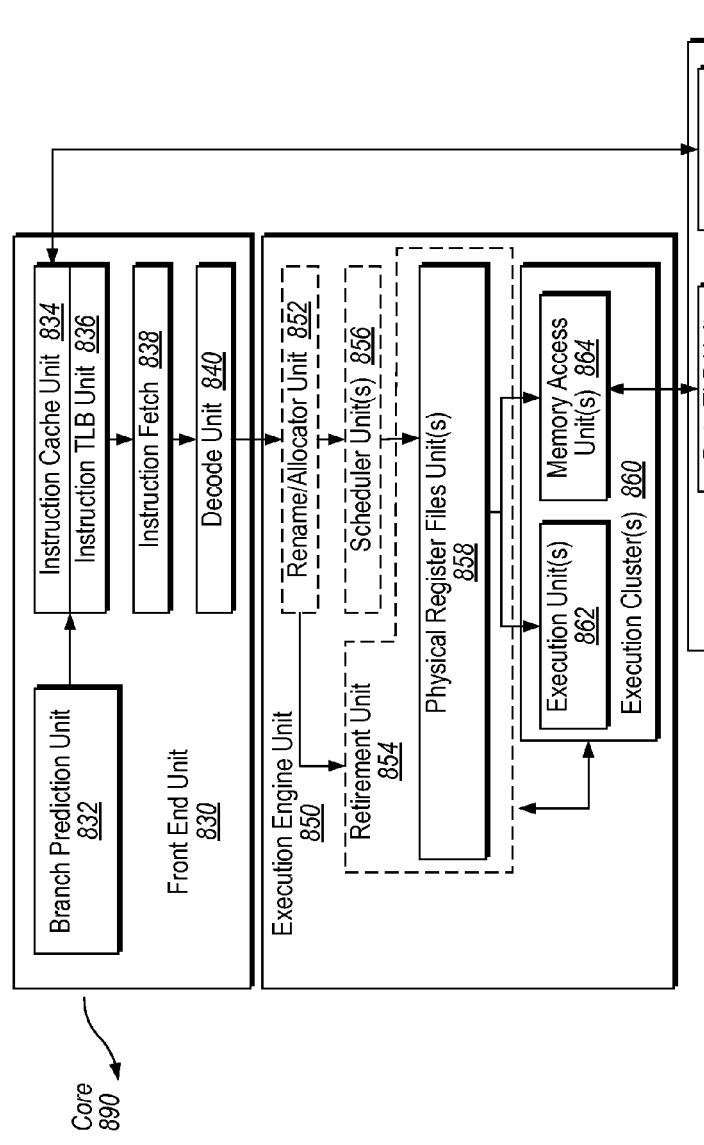
FIG. 8A
FIG. 8B

LOCAL POWER GATE (LPG) INTERFACES FOR POWER-AWARE OPERATIONS

BACKGROUND

To aid in power management of an integrated circuit (IC) such as a multicore processor, the IC may include one or more gated cores for which power may be selectively applied and disrupted, referred to as power gating. Conventionally, power gating is used to intermittently disable or deactivate an entire core to conserve power when circuitry of the gated core is not needed. This may be referred to as placing the gated core in a sleep mode or state. However, such power saving measures are conservative and as a result power consumption of the processor, particularly as a result of leakage current losses, is still higher than optimal.

BRIEF DESCRIPTION OF THE DRAWINGS

FIG. 8A is a block diagram illustrating an in-order pipeline and a register renaming stage, out-of-order issue/execution pipeline according to one embodiment.

FIG. 8B is a block diagram illustrating a micro-architecture for a processor that implements power-aware operations with LPG interfaces according to one embodiment.

DESCRIPTION OF EMBODIMENTS

Figure 1:
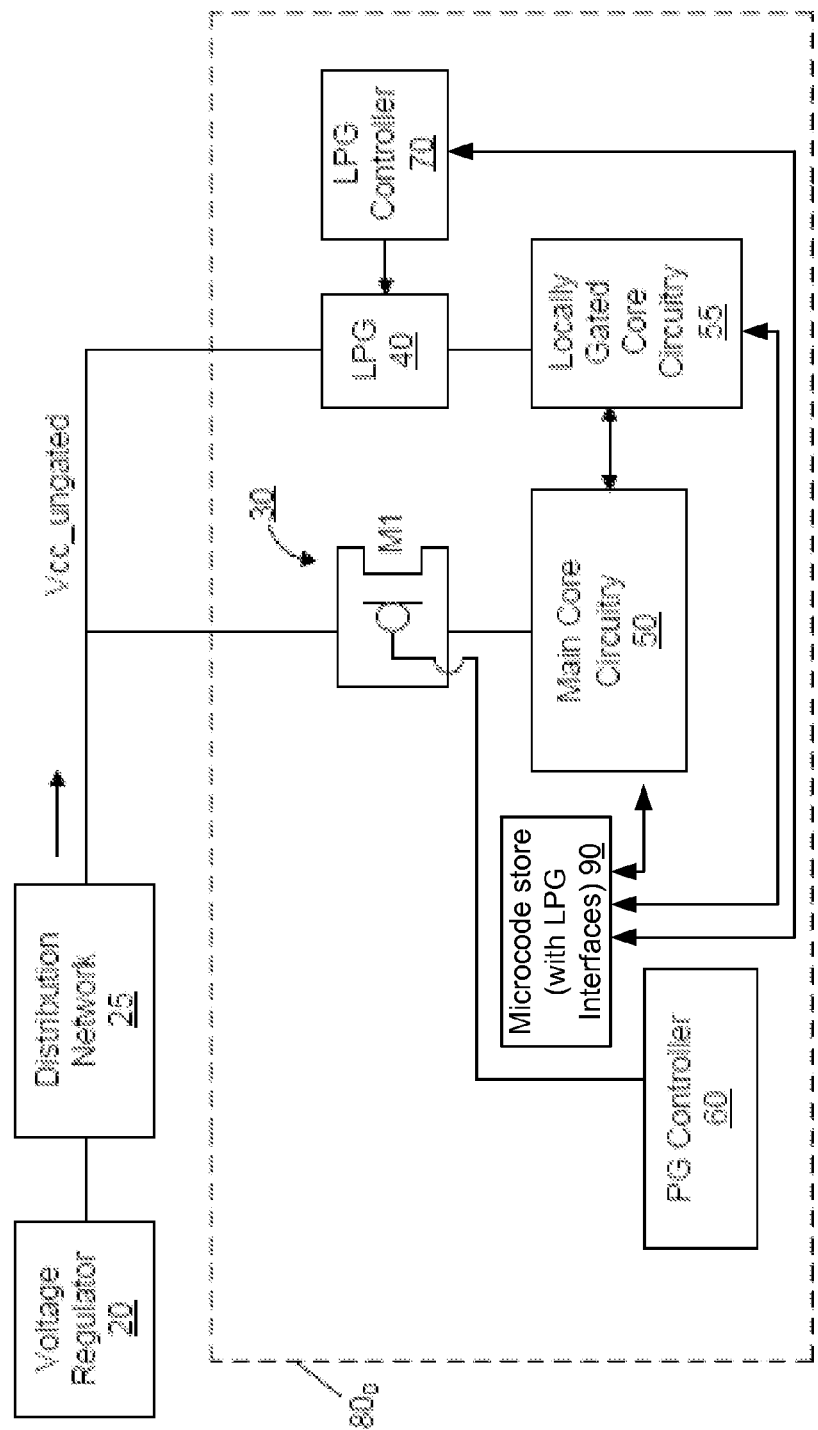
FIG. 1 is a block diagram of a portion of a power distribution system for a core including core circuitry, locally-gated core circuitry, and local power gate (LPG) interfaces for power-aware operations according to one embodiment.

Technologies for local power gate (LPG) interfaces for power-aware operations are described. A processor includes locally-gated core circuitry of a core, main core circuitry of the core, the main core comprising a decode unit and an execution unit, and local power gate (LPG) hardware coupled to the locally-gated core circuitry and the main core circuitry. The LPG hardware is operative to power gate the locally-gated core circuitry according to local power states of the LPG hardware. The decode unit is operative to decode a first instruction of a set of instructions to perform a first power-aware operation of a specified length, the first instruction to compute an execution code path for execution. The execution unit is operative to execute a first micro-operation to monitor a current local power state of the LPG hardware, execute a second micro-operation to select one of a plurality of code paths based on the current local power state, the specified length, and a specified threshold, and execute a third micro-operation in the selected one of the plurality of code paths to issue a hint to the LPG hardware to power up the locally-gated circuitry and to continue execution of the first power-aware operation without waiting for the locally-gated circuitry to be powered up.

Dynamic local power gating (LPG) allows shutting the power for one or more specific domains inside a core of a processor while the core is running. More specifically, LPG may enable power to certain domains of a core to be turned on and off dynamically based on usage. LPG may turn power on and off dynamically based on usage of specific Instruction-Set-Architecture content, e.g., numeric computation or vectorized computation, in which certain regions of the core are unutilized based on software needs. For example, a 2D engine is not used in a general processing on a graphics processing unit (GPGPU) scenario. In addition, certain processor hardware is added for high performance scenarios, while some software may not utilize that hardware. One example of this situation is one or more vector execution units that operate on vector-sized data (e.g., a vector width datum including a plurality of individual data elements). However, when using LPG in a core of a processor, there may be some performance inversion for some performance-critical complicated macroinstructions (e.g., REP MOVE String, REP STORE string), as compared to conventional cores without local power gating. The embodiments described herein take advantage of a close interaction between the local power gating hardware and embodied firmware within the core (e.g., microcode) in order to save power without sacrificing the performance expected from performance-critical complicated macroinstructions (e.g., REP MOVE String, REP STORE String). In some embodiments, the LPG hardware reports its current "power-level" state to the firmware, thus allowing the firmware to select the best execution code paths optimized for minimal performance loss while maximizing power savings. The embodiments of an interface between the hardware and the firmware allows the firmware to be aware of a current local power state of the hardware, to issue hints to the local power gate hardware in order to power up the respective hardware before it is actually being needed, and to select optimal execution code paths based a current task (i.e., "the task at hand"). The following embodiments describe an implementation of rep-string flows, including rep-moves and rep-stores, as examples implementations. It should be noted that other embodiments are not limited to a particular instruction set architecture, and are not limited to rep-string implementations for REP string operations.

FIG. 1 is a block diagram of a portion of a power distribution system for a core including core circuitry, locally-gated core circuitry, and local power gate (LPG) interfaces for power-aware operations according to one embodiment.

As seen in FIG. 1, system 10 includes a microcode store 90 storing microcode. Microcode is a layer of hardware-level instructions or data structures involved in the implementation of higher level machine code instructions in central processing units, and in the implementation of the internal logic of many channel controllers, disk controllers, network interface controllers, network processors, graphics processing units, and other hardware. Microcode can reside in the microcode store 90, which may be special high-speed memory. Microcode can translate machine instructions into sequences of detailed circuit-level operations, or micro-operations. Microcode store 90 can be a ROM, programmable logic array (PLA), static random access memory (SRAM), flash memory, or the like. It should be noted that in some systems, all code in a device, whether microcode or machine code, are termed as firmware. The microcode can also be stored in connection with machine code. Microcode store 90 stores microcode with the LPG interfaces as described in more detail below with respect to FIG. 2.

As shown in FIG. 1, system 10 may be used to provide a regulated voltage to an integrated circuit such as a processor. Although the embodiments described herein are with regard to a multicore processor, understand the scope of the present invention is not limited in this regard, and other embodiments may be used in connection with other integrated circuits or other electronic devices.

As seen in FIG. 1, system 10 includes a voltage regulator 20. In various embodiments, voltage regulator 20 may be an off-chip regulator that provides a regulated voltage to a distribution network 25. First distribution network 25 may include the circuitry such as wires, coupling elements and so forth that provide the regulated voltage (Vcc_ungated) to circuitry within the processor via one or more pins of the processor. In turn, the voltage output from distribution network 25 may be provided through a power gate circuit 30, which may be a core-wide power gate, also referred to as an embedded power gate (EPG). As shown in FIG. 1, EPG 30 may be part of a core 80. While certain components of this single core are shown and described in FIG. 1, understand that embodiments apply equally to a multicore processor in which a plurality of such cores generally similarly adapted as shown in FIG. 1 may be present.

In addition to EPG 30, an additional power gate, referred herein as a local power gate circuit (LPG) 40 is also present. As seen, this separate local power gate circuit may similarly receive the incoming regulated supply voltage Vcc_ungated.

Core 80 of FIG. 1 may be arranged such that different portions of the overall core circuitry can be implemented in separate power domains. For purposes of illustration FIG. 1 shows a first portion of main core circuitry 50 that is present in a first power domain and that receives a supply voltage via EPG 30 and a second portion of the core circuitry corresponding to LPG locally-gated core circuitry 55 that in turn is of a separate power domain and receives a supply voltage via LPG 40. Note that although a single LPG and a corresponding single power plane coupled to receive a supply voltage from this LPG is shown, the scope of the present invention is not limited in this regard and multiple such local power gate circuits and corresponding power planes can be present in other embodiments. In the arrangement of FIG. 1, main core circuitry 50 may include all portions of core circuitry other than the LPG locally-gated core circuitry 55, which in an embodiment may correspond to a vector processing unit (VPU) or other such functional unit.

Each of first and second power gate circuits 30 and 40 may be implemented as one or more switching devices such as a metal oxide semiconductor field effect transistor (MOSFET) (e.g., transistor M1 shown in power gate circuit 30). In one implementation, the MOSFETs may be P-channel MOSFETs (PMOS) although other implementations may use N-channel MOSFETs (NMOS) or other such switching devices. For the circuit shown in FIG. 1, PMOS device M1 of first power gate circuit 30 may be gated by a control signal received from a first controller 60 at a gate terminal of the PMOS device. Thus when enabled, the regulated voltage may be provided through power gate circuit 30, e.g., from a source terminal to a drain terminal of MOSFET M1. The enabled switch thus provides a supply voltage. As seen, this power gate voltage may then be provided to main core circuitry 50. Similar control of LPG 40 can be realized via LPG controller 70 to thus provide a regulated supply voltage to LPG locally-gated core circuitry 55 when LPG 40 is enabled. As will be described further below, controllers 60 and 70 may operate to control these power gate switches based on various inputs. In general, the inputs may correspond to information regarding operating parameters of the processor, and its sub-components including activity level, various overheads, fixed values and so forth, as will be described further below.

In one embodiment, the core 80 is operative to execute the microcode stored in the microcode store 90. The microcode 90 may include the LPG interfaces described in more detail with respect to FIG. 2. In one embodiment, the microcode is operative to monitor a current status of the locally-gated core circuitry. For example, the microcode can execute a dedicated micro-operation, such as select_path( ), to monitor the current status. The current status can be a LPG power state, a power level indication, or the like. The microcode can select a first code path for execution when the current status allows execution of micro-operations of a first length (e.g., 16-bytes) only and a current string operation is shorter in length than a pre-defined threshold. For example, the pre-defined threshold could be 2K bytes so that if the current string operation is less than the pre-defined threshold, the microcode may decide to keep the LPG hardware in a sleep state, but power up the LPG hardware when the current string operation is greater than the pre-defined threshold. Of course, different values for the pre-defined threshold can be used. For another example, string lengths below 2500 bytes it is better to not wake up portions of the core that are OFF since their wake-up latency is longer than the amount of time needed to finish the string operation using 16 Byte load/store operations.

At a beginning of the first code path, the microcode can initiate a first power-up sequence by the LPG hardware (e.g., LPG 40 or LPG controller 70) to power up the locally-gated core circuitry 55 for execution of the micro-operations of the second length and continue execution of the micro-operations of the first length without waiting for the first power-up sequence to complete. The microcode can select a second code path for execution when the current status allows execution of micro-operations of a second length (e.g., 32-bytes) only and the current string operation is shorter in length than the pre-defined threshold. At a beginning of the third code path, the microcode can initiate a second power-up sequence by the LPG hardware (e.g., LPG 40 or LPG controller 70) to power up the locally-gated core circuitry 55 for execution of the micro-operations of the third length and continue execution of the micro-operations of at least the first length or the second length without waiting for the second power-up sequence to complete. The microcode can select a third code path for execution of micro-operations of a third length (e.g., 64-bytes) when the current string operation is longer in length than the pre-defined threshold.

In a further embodiment, the microcode can check a throttling status of a micro-operation scheduler (not illustrated in FIG. 1) at the beginning of the third code path. The throttling status can be an insufficient current supply protector (ICCP) license status, a current-supply license indication, or the like. When the micro-operation scheduler is throttling, the execution of the micro-operations of the second length continues. When the micro-operation scheduler is not throttling, execution of the micro-operations of the third length continue.

In a further embodiment, the microcode can program a jump-table register to point to the first code path with a first execution loop of the first length when the first code path is selected, program the jump-table register to point to the second code path with a second execution loop of the second length when the second code path is selected, and program the jump-table register to point to the third code path with a third execution loop of the third length when the third code path is selected.

In another embodiment, the microcode can map a power level indication of the LPG hardware to a first zero-penalty, mode-based-branch (MBB) micro-operation. During operation, the microcode maps the power-level indication and the condition that the MBB checks for. The first zero-penalty, mode-based-branch micro-operation allows execution of the current string operation using the micro-operations of the first length in the first code path until the second power-up sequence completes and then continue the execution of the current string operation using the micro-operations of the third length in the third code path. For example, when the current power level indication is at a level where 64 B micro-operations can be performed, the zero-penalty mode-based-branch can include an if-then-else statement at an end of the 16 B loop to check if the current power level indication has raised from 16 B micro-operations allowed to 64 B micro-operations allowed in order to leave the 16 B loop to the 64 B loop. In another embodiment, the microcode can map a current-supply license indication to a second zero-penalty, mode-based-branch micro-operation that allows execution of the first power-aware operation using micro-operations of the second length in the second code path.

In another embodiment, the main core circuitry 50 includes a decode unit and an execution unit (not illustrated in FIG. 1). The LPG hardware, including LPG 40 and LPG controller 70, is coupled to the LPG locally-gated core circuitry 55 and the main core circuitry 50. The LPG hardware is operative to power gate the LPG locally-gated core circuitry 55 according to local power states of the LPG hardware. The decode unit is operative to decode a set of instructions to perform a power-aware operation and the execution unit is to execute one or more micro-operations based on the set of instructions. The power-aware operation can be a string operation, a repeat string operation, or other complicated macroinstructions of a specified length. The "specified length" is an argument that the string-operation, e.g., REP MOVS, receives from the software, e.g., in RCX register. The value in RCX register determines whether the overall string-operation will be short, medium, or long. A first instruction of the power-aware operation can compute an execution code path for execution. For example, the main core circuitry 50 (e.g., an execution unit of main core circuitry 50) is operative to execute a first micro-operation to monitor a current local power state of the LPG hardware. The main core circuitry 50 also executes a second micro-operation to select one of multiple code paths based on the current local power state, the specified length, and a specified threshold. The main core circuitry 50 also executes a third micro-operation in the selected one of the code paths to issue a hint to the LPG hardware to power up the locally-gated circuitry 55 and to continue execution of the first power-aware operation without waiting for the locally-gated circuitry 55 to be powered up.

In one embodiment, the second micro-operation programs a jump-table register to point to a first-length code path when the current local power state allows execution of micro-operations of the first length and the specified length is shorter than the specified threshold. Alternatively, the second micro-operation programs the jump-table register to point to a second-length code path when the current local power state allows execution of micro-operations of the second length and the specified length is shorter than the specified threshold. The second length is greater than the first length. For example, the first length can be 16-bytes in length and the second length can be 32-bytes in length. Alternatively, the second micro-operation programs the jump-table register to point to a third-length code path when the specified length is longer than the specified threshold. The third length is greater than the second length. For example, the third length can be 64-bytes in length.

In another embodiment, the first micro-operation is further operative to map a power level indication of the current lower power state to a first zero-penalty, mode-based-branch micro-operation that allows execution in the first-code path until the locally-gated circuitry 55 is powered up and then continue the execution in the third-length code path.

When the first-length code path is selected, the main core circuitry 50 is further operative to execute the third micro-operation at a beginning of the first-length code path to initiate a power-up sequence by the LPG hardware to power up the locally-gated core circuitry 55 to execute a second set of subsequent micro-operations of the second length in the second-length code path. Without waiting for the power-up sequence to complete, the main core circuitry 50 is to execute a first set of subsequent micro-operations of the first length in the second-length code path. In a further embodiment, the main core circuitry 50 is further operative to execute the second set of subsequent micro-operations of the second length in the second-length code path when the power-up sequence is completed. The second set can be executed when the current local power state allows execution of operations of the second length (e.g., 32-bytes). When the second-length code path is selected, the main core circuitry 50 is further operative to execute subsequent micro-operations of the second length in the second-length code path. When the third-length code path is selected, the main core circuitry 50 is further operative to execute the third micro-operation at a beginning of the third-length code path to initiate a power-up sequence by the LPG hardware to power up the locally-gated core circuitry 55 to execute a second set of subsequent micro-operations of the third length (e.g., 64-bytes) in the third-length code path. Without waiting for the power-up sequence to complete, the main core circuitry 50 can execute a first set of subsequent micro-operations of the first length in the third-length code path. When the main core circuitry 50 sees that the string length is above threshold, the main core circuitry 50 powers-up the widest possible hardware (HW), e.g., to allow 64 byte operations. While waiting for the power up of the widest possible hardware, the main core circuitry can do some useful processing and perform a loop using memory-operations that LPG currently allows, e.g., 16 byte or 32 byte. The main core circuitry 50 is further operative to execute the second set of subsequent micro-operations of the third length in the third-length code path when the power-up sequence is completed. The second set can be executed when the current local power state allows execution of operations of the third length (e.g., 64-bytes). When the third-length code path is selected, the main core circuitry 50 is further operative to execute the third micro-operation at a beginning of the third-length code path to initiate a power-up sequence by the LPG hardware to power up the locally-gated core circuitry 55 to execute a second set of subsequent micro-operations of the third length in the third-length code path. The main core circuitry 50 is also operative to execute a fourth micro-operation to check for an insufficient current supply license in which a micro-operation scheduler throttles execution by dispatching micro-operations at a specified clock cycle instead of every clock cycle. For example, the insufficient current supply license can be an ICCP license. The first micro-operation is further operative to map a current-supply license indication to a second zero-penalty, mode-based-branch micro-operation that allows execution of the first power-aware operation in the second-length loop when there is insufficient current supply license and allows execution of the first power-aware operation in the third-length loop when there is sufficient current supply license. When there is insufficient current supply license, the main core circuitry 50 executes the first set of subsequent micro-operations of the second length in the second-length code path. The main core circuitry 50 can execute the second set of subsequent micro-operations of the third length in the third-length code path when the power-up sequence is completed. The second set can be executed when the current local power state allows execution of operations of the third length (e.g., 64-bytes).

In one embodiment, the first power-aware operation is a repeat (REP) string operation. The first-length code path may be a 16-byte code path, the second-length code path may be a 32-byte code path, and the third-length code path may be a 64-byte code path.

A REP instruction, also called "repeats," is a string instruction that is executed the number of times specified in a count register ((E)CX) or until an indicated condition of the ZF flag is no longer met. The REP (repeat), REPE (repeat while equal), REPNE (repeat while not equal), REPZ (repeat while zero), and REPNZ (repeat while not zero) mnemonics are prefixes that can be added to one of the string instructions. The REP prefix can be added to the INS, OUTS, MOVS, LODS, and STOS instructions. It should be noted that the REP prefixes apply only to one string instruction at a time. To repeat a block of instructions, a LOOP instruction, or another looping construct, may be used. All of these repeat prefixes cause the associated instruction to be repeated until the count in register (E)CX is decremented to 0. For example, if the current address-size attribute is 32, register ECX is used as a counter, and if the address-size attribute is 16, the CX register is used. A repeating string operation can be suspended by an exception or interrupt. When this happens, the state of the registers is preserved to allow the string operation to be resumed upon a return from the exception or interrupt handler. The source and destination registers point to the next string elements to be operated on, the EIP register points to the string instruction, and the ECX register has the value it held following the last successful iteration of the instruction. This mechanism allows long string operations to proceed without affecting the interrupt response time of the system. As an example, a REP STOS instruction can be used to initialize a large block of memory quickly.

In a further embodiment, the decode unit is operative to decode a second instruction of the set of instructions to compute an early tail condition and the execution unit of the main core circuitry 50 executes one or more micro-operations based on the second instruction. For example, the main core circuitry 50 executes a sixth micro-operation to compute the early tail condition based on the second instruction. The main core circuitry 50 executes the second micro-operation to select one of the code paths when there is no early tail in view of the early tail condition and does not execute the second micro-operation when there is an early tail in the view of the early tail condition.

In some implementations, there is an interconnection between the main core circuitry and the LPG locally-gated core circuitry 55 (e.g., a functional unit that is subject to local power gating). In the embodiment of FIG. 1, the LPG locally-gated core circuitry 55 may correspond to a VPU, and the main core circuitry 50 may include other functional units of the core 80, although the scope of the present invention is not limited in this regard. Further, understand that while only a single such locally power gated circuit is shown, additional such locally power gated circuits may be present and can be implemented in one or more separate power domains than a remainder of the core circuitry. The interconnection may include an isolation circuit to logically isolate the LPG locally-gated core circuitry 55 from the remainder of main core circuitry 50 when it is not enabled.

The system 10 may include detection logic to detect upcoming usage of gated logic. Since power up takes time, detection logic may detect this usage as early as possible to prevent performance loss (which would typically involve stalling the machine until the unit is ready). In some implementations, this can be done at an early detection stage, or may be done speculatively by a predictor.

The system 10 may further include decision logic to control the policy of entering into a local power save state. In various implementations a timer with a watchdog or a task-based predictor can implement this detection logic. In addition, a finite state machine (FSM) logic may define and control state transitions (power on/off, etc.) and notify the power monitors that power is saved.

For purposes of illustration herein, a power domain to be controlled to be selectively enabled or disabled based on usage may be a VPU. However understand that various domains can be power gated via a local power gate and power-aware operations can be executed with the LPG interfaces described herein. In one implementation a VPU may include floating point execution units (two 128 bit ports) and a register file, and thus may contribute to a large portion of core leakage. As such, embodiments may contribute to substantial total core power saving with minimal performance loss.

In an embodiment, multiple LPG power states can be defined. In one embodiment, a first state, referred to as a LC0 or normal operation, is a state in which the EPG is on; a second state, referred to as a LC3, is a state in which the gated circuit is at a retention voltage. In this case, the gated circuit interface is isolated and all data is isolated (both inputs and outputs). Finally a third state, referred to as a LC6, is a state in which the gated circuit is fully power gated. In this case the interface is isolated and the local gated circuit power is off. To realize this state, a reset and save/restore of the registers may occur.

The motivation for providing an LC3 state is to provide power saving with little penalty for applications with high VPU code usage. As an example, the LC3 power up penalty may be as low as 3.2 nanoseconds (ns) (~16 cycles at 5 GHz)

while for the LC6 save and restore, the penalty can be hundreds of cycles. Note that in other implementations, by not applying local power gating to the register file, a LC3 state can be avoided, thus saving on design complexity. In some embodiments LC3 saves 70% of the gated circuit leakage when the core is at normal voltage.

In some implementations, detection can be done during instruction decoding. As an example, a dedicated decode unit may detect VPU instructions or memory instructions using a VPU register. When detected, the decode unit can signal the LPG controller, which turns the power on and unlocks isolation between this gated circuitry and a remainder of the core circuitry. In some implementations, the controller will stall the machine if the instruction passes the instruction queue and the VPU is not yet powered up. When exiting the LC6 state, the controller may also reset the logic and send an interrupt to an agent that in turn restores the contents of the VPU registers. In one implementation, this agent may be low-level system software or firmware (such as code morphing software (CMS)). Note however that the ability to take interrupts and save/restore register state could be part of any low level software. For a simple form of LPG that uses a hardware timer to enter low power states and that powers back up on demand, such low level software, can service these interrupts. In some implementations, providing a DBT allows a more sophisticated mechanism for learning and predicting when a given resource can be power gated in an eager manner with maximum efficiency. Note that an alternative detection method may be a power on hint provided by CMS. The hint can be provided early enough so exiting the save state will not stall the machine.

The detection logic may also identify when the pipeline is free of VPU instructions. Unlike most instructions that complete after a known number of cycles, a memory instruction may have unpredictable latency. In case of load of a VPU register with a cache miss, the memory logic (such as a miss tracker in the memory ordering system) may continue to keep signaling the LPG controller that a VPU load is in process to avoid turning off the logic before the load completes and writes to the register.

The core 80 can be implemented as one core of a System on Chip (SoC), which may include multiple functional hardware units, such as CPUs, GPUs, modems, audio digital signal processor (DSP), a camera unit, a display system unit, cache elements, computation elements, voltage regulator (VR) phases, input/output (I/O) interfaces, and their controllers, network controllers, fabric controllers, or any combination thereof. These functional units may also be logical processors, which may be considered the processor cores themselves or threads executing on the processor cores. A thread of execution is the smallest sequence of programmed instructions that can be managed independently. Multiple threads can exist within the same process and share resources such as memory, while different processes usually do not share these resources. The components of FIG. 1 can reside on "a common carrier substrate," such as, for example, an integrated circuit ("IC") die substrate, a multi-chip module substrate or the like. Alternatively, the computing system may reside on one or more printed circuit boards, such as, for example, a mother board, a daughter board or other type of circuit card. In other implementations, the main memory and the computing system can reside on the same or different carrier substrates. For example, a SoC may be integrated on a single integrated circuit (IC) die within a package. There may be other configurations of the computing system, such as a Package on Package (PoP) configuration. PoP is an integrated circuit packaging method that combines vertically discrete logic and memory ball grid array (BGA) packages. Two or more packages are installed atop each other, i.e., stacked, with an interface to route signals between them. PoP configurations allow higher component density in devices, such as mobile phones, personal digital assistants (PDA), tablets, digital cameras and the like. For example, the SoC can be in a first package on the bottom (side closest to motherboard) and a memory package on the top. Other configurations are stacked-die packages where multiple integrated circuit dies are stacked instead of packages as described above. The computing system may include one or more functional units that execute instructions that cause the computing system to perform any one or more of the methodologies discussed herein. The computing system may be connected (e.g., networked) to other machines in a LAN, an intranet, an extranet, or the Internet. The computing system may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for the computing system, the term "machine" shall also be taken to include any collection of machines that individually or jointly execute a set (or multiple sets) of instructions to perform any one or more of the methodologies discussed herein.

In addition to the illustrated components, the computing system may include one or more processors, one or more main memory devices, one or more static memory devices and one or more data storage device, which communicate with each other via a bus. The processors may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), network processor, or the like. In one embodiment, processor may include one or processing cores. The processor is configured to execute the processing logic for performing the operations discussed herein. Alternatively, the computing system can include other components as described herein, as well as network interface device, video display units, alphanumeric input devices, cursor control devices, a signal generation device, or other peripheral devices.

In another embodiment, the computing system may include a chipset (not illustrated), which refers to a group of integrated circuits, or chips, that are designed to work with the SoC and controls communications between the SoC and external devices. For example, the chipset may be a set of chips on a motherboard that links the CPU to very high-speed devices, as well as linking the CPU to lower-speed peripheral buses of peripherals, such as USB, PCI or ISA buses.

The data storage device (not illustrated) may include a computer-readable storage medium on which is stored software embodying any one or more of the methodologies of functions described herein. The software may also reside, completely or at least partially, within the main memory as instructions and/or within the SoC as processing logic during execution thereof by the computing system. The computer-readable storage medium may also be used to store instructions for the operations as described herein and/or a software library containing methods described herein. The computer-readable storage medium can be the microcode store that stores the microcode or firmware that executes the methods described herein.

Figure 2:
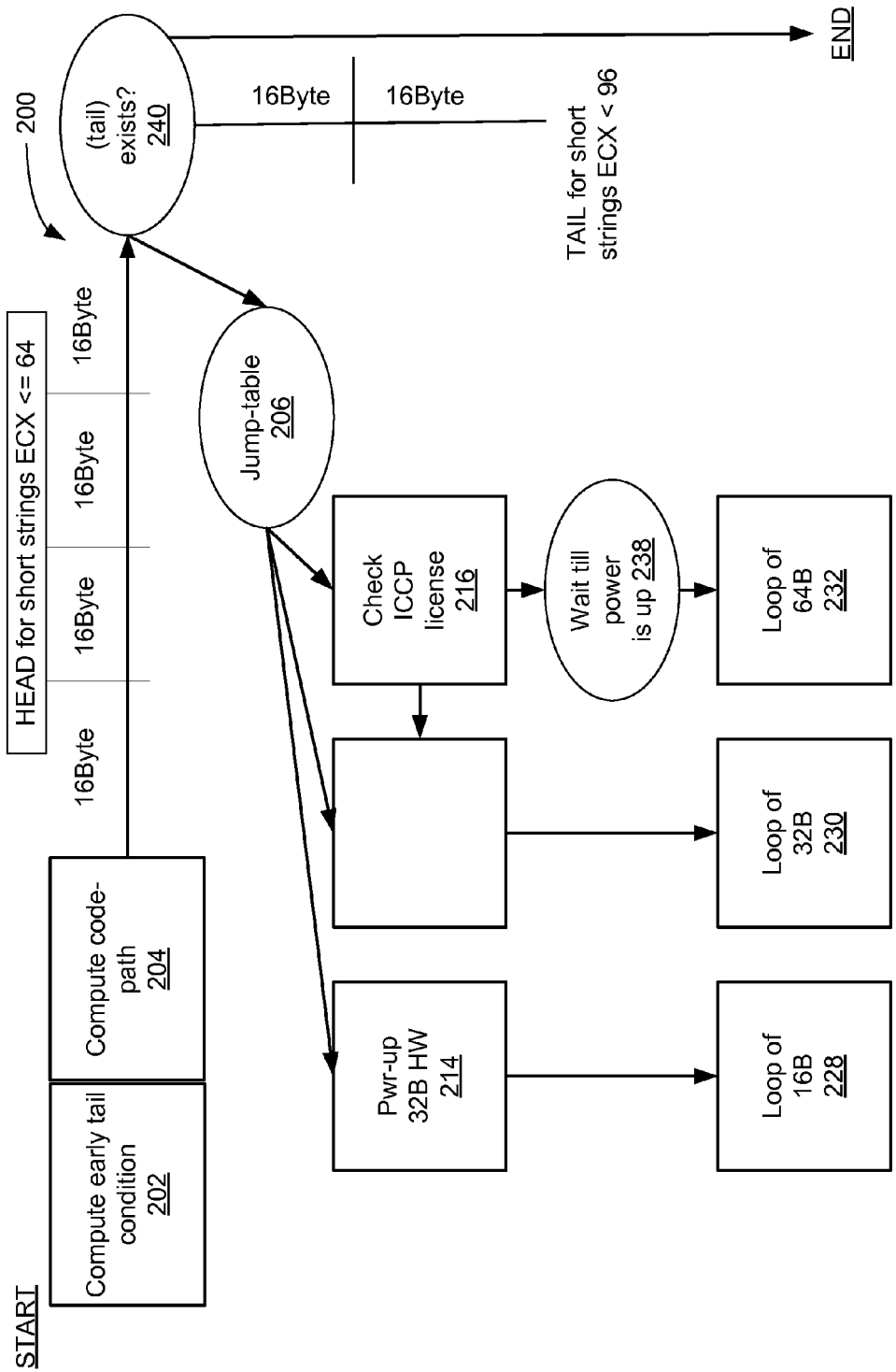
FIG. 2 is a flow diagram of a high-level algorithm for a power-aware REP string operation using the LPG interfaces according to one embodiment.

FIG. 2 is a flow diagram of a high-level algorithm for a power-aware REP string operation using the LPG interfaces according to one embodiment. FIG. 2 illustrates the main building blocks to perform a power-aware operation. The LPG interfaces may be hardware/firmware interfaces that allow obtaining optimal power and performance results in these power-aware operations, such as shown in the REP string implementation in FIG. 2.

As seen in FIG. 2, an algorithm 200 starts a String operation by computing a code path (block 204) near the beginning of the flow. The compute code path at block 204 can be a dedicated micro-operation (Interface #1), called select_path( ). The compute code path at block 204 is executed in order to monitor the current status of the HW local-power-state. The compute code path also crossbreeds the current status with the length of the String operation. The following three combinations are possible in this embodiment: a) the current status of the LPG allows execution of 16 B operations only and the string operation length is shorter than a pre-defined threshold. In that case the select_path( ) micro-operation programs a Jump-Table register 206 to point to a 16 B loop 228; b) the current status of the LPG allows execution of 32 B operations only and the string operation length is shorter than a pre-defined threshold. In this case, the select_path( ) micro-operation programs the Jump-Table register 206 to point to a 32 B loop 230; or c) the string operation length is longer than the pre-defined threshold or the current status of the LPG allows execution of 64 B operations. In that case the select_path( ) micro-operation programs the Jump-Table register 206 to point to a 64 B loop 232. In the 64 B loop 232, the algorithm wakes up the HW that might be in a sleep mode.

At the beginning of the "16 B code path" 228, a dedicated micro-operation (Interface #2) 214, called active_LPG(32), is executed in order to start a power-on operation (e.g., a first power-up sequence by the LPG hardware) to power on the hardware needed for execution of 32 B micro-operations. But, instead of waiting for the power-on operation to complete like regular macro-instructions have to do, the algorithm 200 performs the loop using 16 B operations in the 16 B code path 228. The 16 B micro-operations can always be performed. The active-LPG(32) can be issued in order to activate the LPG hardware in anticipation that similar REP string operations will be performed hereafter.

At the beginning of the "64 B code path" 232, there may be another hurdle that requires consideration: insufficient current-supply. In addition to the LPG hardware, a current-supply protector (ICC-Protector or ICCP) can be used to ensure there will be no drastic current drop (IR-drop) in case the current-supply does not suit the current-requirements of the executed micro-operations. If there is gap, i.e., insufficient ICCP-license, the micro-operation scheduler (micro-operations (μops) scheduler) may throttle the execution, and dispatch a micro-operation every N clocks instead of every-clock. Thus, in order to ensure the "loop of 64 B" code 232 does not suffer from negative performance due to ICCP-throttle, the algorithm 200 executes a dedicated micro-operation (Interface #3) 216 (labeled "check ICCP license"). The dedicated micro-operation 216 can map the ICCP-license indication to a zero-penalty Mode-Based-Branch (MBB) micro-operation that steers the algorithm 200 to the "Loop of 32 B" 230, which can be performed under any ICCP-license conditions.

Prior to performing the "64 B code path" 232, a dedicated micro-operation (Interface #1) (not illustrated in FIG. 2), called active_LPG(64), is executed in order to start a power-on operation (e.g., a second power-up sequence by the LPG hardware) to power on the hardware needed for execution of 64 B micro-operations. But, instead of waiting for the power-on operation to complete like regular macro-instructions have to do, the algorithm 200 executes a dedicated micro-operation (Interface #4) 238 (labeled "wait until power is up"). The dedicated micro-operation 238 can map a power level indication (e.g., LPG-power-level indication) to a zero penalty Mode-Based-Branch micro-operation that allows the algorithm 200 to start performing the String operation using 16 B micro-operations in the 64 B loop until the second power-up sequence completes and then proceed with the 64 B code path 232. It should be noted that micro-operation 238 is not just a single micro-operation, but rather is a sequence of micro-operations running in a loop using 16 B operations (e.g., four at a time) until power-on indication is observed. Assuming that the String length is long, i.e., above the pre-defined threshold, the algorithm 200 provides the best tradeoff between performance and power.

In a further embodiment, the algorithm 200 starts the String operation by computing an early tail condition (block 202) near the beginning of the flow. A head for short strings can be, for example, less than or equal to 64 B (e.g., ECX<=64). A tail may exist for short strings when greater than 64 B (e.g., ECX<96). When the early tail condition is computed, the algorithm 200 can determine if a tail exists (block 240) as a condition for selecting the one of the three code paths. If no tail exits, the algorithm 200 can select one of the 16 B loop 228, 32 B loop 230 or 64 B loop 232. If a tail exists, the algorithm 200 can end the flow. It should be noted that at block 240 the algorithm 200 can be steered in three possible directions depending on the early computation done in block 202. If the string length is greater than 96 the algorithm 200 can proceed to block 206. If the string length is greater than 64, the algorithm 200 can proceed to TAIL. And, if the string length is lower or equal to 64, the algorithm 200 can proceed directly to EOM.

The embodiments described herein can be abstracted into the following three basic building blocks: 1) a first mechanism to be aware of a local power state of the LPG hardware; 2) a second mechanism to issue hints to the LPG hardware in order to bring the power up before it is actually needed, but can continue execution before completion of the power up; and 3) a third mechanism to select an optimal execution code path based on a current operation (i.e., "task at hand"). For example, as seen in FIG. 2, the first mechanism can map the LPG-power-level indication to a zero-penalty MBB micro-operation. The first mechanism (or a separate mechanism) can map the ICCP-license indication to a zero-penalty MBB micro-operation. As seen in FIG. 2, the second mechanism can use a dedicated micro-operation, such as activate_LPG (for 32 B micro-operations) without waiting for the power up to be completed or activate_LPG (for 64 B micro-operations) without waiting for the power up to be completed. The third mechanism can be a dedicated micro-operation that selects an optimal execution code path based on the current operation (e.g., REP string operation), such as select_path (current LPG state, string length, threshold). The embodiments can be used to make complicated macro-instructions execute with the best performance possible, even when LPG is utilized to conserve power of the core. Because the embodiments are aware of the LPG hardware state, an appropriate code path can be selected for the micro-operations to execute the complicated macro-instruction. In one embodiment, these building blocks can be implemented in firmware of the core. The firmware can strike a balance between power and performance. These mechanisms can be information commands communicated between the firmware and the hardware. For example, the firmware can consult with the LPG hardware (e.g., LPG controller) to be aware of the current status (e.g., current power level). For example, the firmware can determine if the core is already using hardware for 16 B micro-operations, 32 B micro-operations, or 64 B micro-operations. Also, if the firmware determines that macro-operations will not be very long, the firmware may decide to not wake up portions of the core. When the firmware decides to wake-up portions of the core, the firmware can continue executing micro-operations with shorter lengths until the portions are powered up. Similarly, in another embodiment, these building blocks can be implemented in microcode of the core. The microcode can utilize various if-then-else statements to map different levels of efficiencies to different power conditions of the LPG hardware. The microcode also has the ability to turn on the LPG hardware ahead of time without any stalls.

Figure 3:
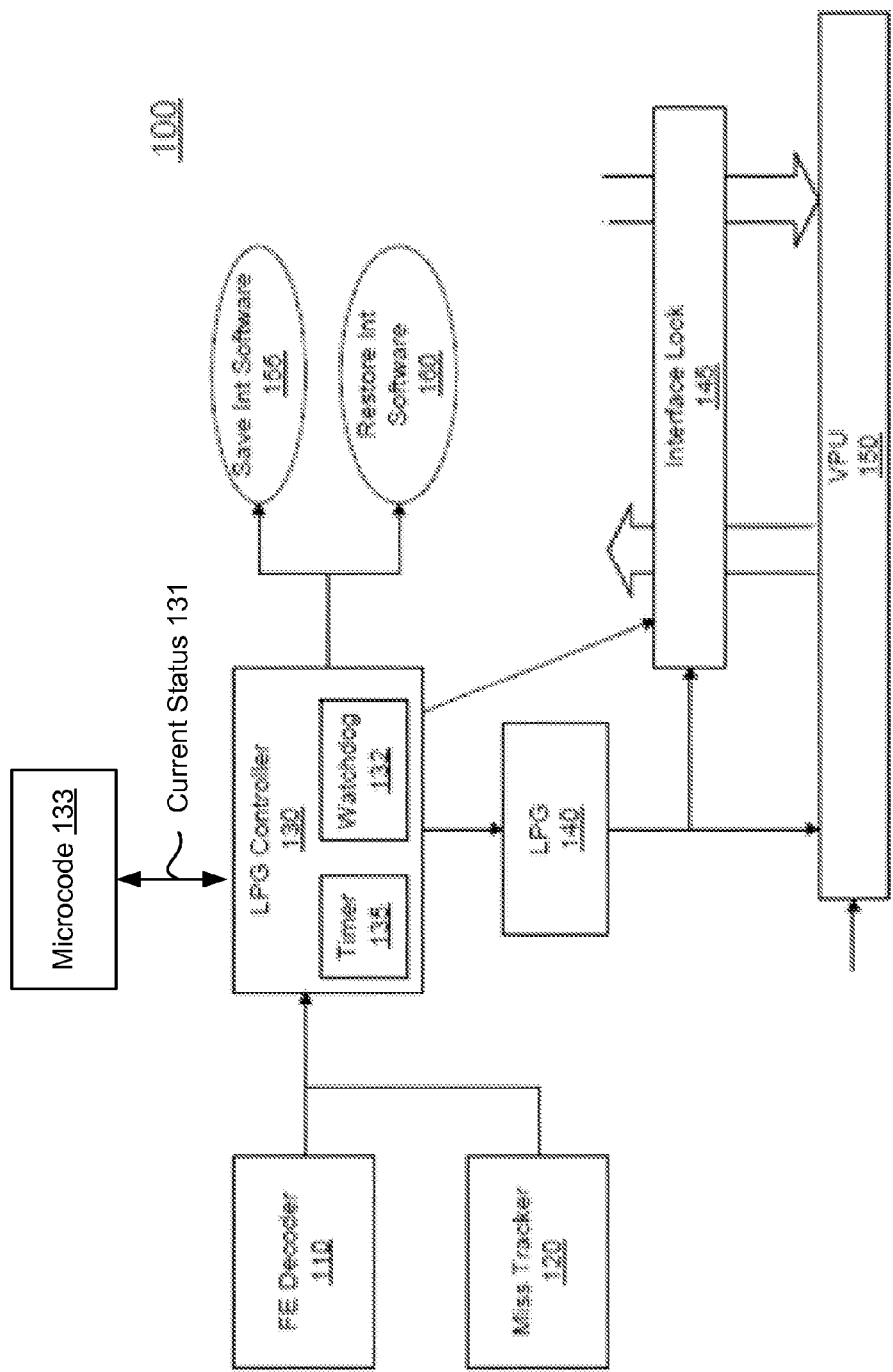
FIG. 3 is a block diagram of an LPG arrangement for power-aware operations in accordance with an embodiment of the present invention.

Referring now to FIG. 3, shown is a block diagram of a LPG arrangement for power-aware operations in accordance with an embodiment of the present invention. As shown in FIG. 3, a processor 100 can include various elements. For ease of illustration, only components involved in performing LPG operations are shown. Specifically, the embodiment of FIG. 3 is with regard to gating of a VPU 150 which can have various components for performing single instruction, multiple data (SIMD) operations, or the like, including registers, execution units, control logic and so forth. VPU 150 may be powered on when an LPG 140 is enabled to provide power to the unit. Otherwise, VPU may be powered off and can be isolated from other circuitry of a core via an interface lock 145, which may provide logic isolation.

As further seen in FIG. 3, LPG control can be by way of an LPG controller 130 that includes a timer 135. FIG. 3 shows an embodiment in which a pure hardware approach is provided to power gate VPU 150 depending on whether VPU instructions are present in the machine. Specifically a front end decoder 110 may receive incoming instructions and decode them. When a vector-based instruction is decoded in decoder 110, an indication signal can be sent to controller 130 to thus indicate the presence of this vector instruction in the machine. When this indication is received in LPG controller 130, the timer may be reset to an initial value. In an embodiment, timer 135 may be configured as a countdown timer that counts from its initial value down to a zero value. When the zero value is reached, indicating a lack of a vector instruction for a certain length of time (e.g., as measured in cycles) LPG controller 130 may trigger power gate circuitry 140 to trigger to thus cause VPU 150 to enter into a given local low power state.

As further seen, a miss tracker 120 is also present. This tracker may maintain track of pending memory operations that implicate vector data and which are in flight (that is, a memory request has not yet been fulfilled). The presence of entries in this tracker may similarly cause an indication signal to be sent to LPG controller 130 to similarly cause timer 135 to be reset and may be released from reset only when the miss tracker is cleared. While shown with these specific detection logics, understand the scope of the present invention is not limited in this regard.

Still referring to FIG. 3, LPG controller 130, in addition to controlling LPG 140, may further provide control signals to various interrupt handlers. As shown in FIG. 3, a first interrupt handler 155 may be a state save interrupt handler, which can be generated by hardware to cause the software to save the state present in VPU 150 prior to entry into a deep low power state (e.g., LC6). Similarly, when LPG controller 130 is to cause LPG 140 to return from the deep low power state provide power to thus power on VPU 150, controller 130 may send a control signal to a second interrupt handler, namely a restore interrupt handler 160, which then may cause software to restore previously saved state for the VPU when it is again powered up. Although shown at this high level in the embodiment of FIG. 3, understand the scope of the present invention is not limited in this regard. For example, OS or microcode or any other means may serve the save/restore request.

Still referring to FIG. 3, LPG controller 130 can track a current status 131 of the LPG 140, such as a current power level, a current power state or the like. The microcode 133 can monitor the current status 131 of the LPG 140 in order to select an appropriate code path, to issue hints to the LPG 140 to power up in some cases, and potentially to determine when to jump to another code path when certain power conditions are met during execution (e.g., when the LPG 140 is powered up, execution may jump from executing 16 B micro-operations in the 16 B loop to executing 64 B micro-operations in the 64 B loop), as described above with respect to FIG. 2.

Decision logic of the LPG controller may be implemented in alternate algorithms. For example, a pure hardware approach or a hardware/software co-design approach could be used. In an embodiment, the pure hardware approach contains a timer and a watchdog 132 as just described. The timer counts down when no VPU instructions are in the pipeline and is reset to its initial value if a VPU instruction is in the pipeline. When the timer expires, the LPG can transient to a save state. In an embodiment there can be two controls: one for LC3 and one for LC6, each with different timer values and actions. The watchdog role is to adjust the timer value to limit performance loss on the one hand while gaining more power on the other. In an embodiment, parameters to be considered may include a maximum allowable performance loss and watchdog responsiveness (via an averaging interval).

In an embodiment the watchdog algorithm may be implemented as follows. After a predetermined interval, the performance loss can be calculated. If the loss is higher than a threshold level, the timer value can be adjusted, e.g., doubled. If instead this loss is lower than the threshold value, the timer value can be adjusted in the other direction, e.g., halved. Also in an embodiment, there can be maximum and minimum possible timer values to prevent over and under shoot.

In an embodiment the LPG controller may be configured to ensure entry into the LC0 state on reset, entering and exiting LC3/6 according to the detection and decision policy. In an embodiment, various state changes and interactions can be taken into account, as set forth in Table 1:

TABLE 1

| Next state | Present state | |
|---|---|---|
| | LC3 | LC6 |
| LC3 | NA | NA, no action |
| LC6 | Exit LC3, Enter LC6 | NA |
| C6 | Exit LC3, Enter C6 | C6 without VPU save (VPU registers are saved to C6 area) |
| C0 | NA | C0 without VPU restore |

Table 1 thus shows, in a first row a present state of a given functional unit, and the corresponding actions to be taken upon transition to a different power state (shown in the second to fifth row of Table 1). In an embodiment, note that the local power states LC0, LC3 and LC6 may generally correspond to and have the same operational characteristics of the core power states of an Advanced Configuration and Power Interface (ACPI) specification such as the Advanced Configuration and Power Interface Specification, revision 3.0b, Oct. 10, 2006. That is, the LC0 state may generally correspond to the state of C0, while the LC3 state may generally correspond to the C3 state, and the LC6 state may generally correspond to the C6 state, in an embodiment.

In another embodiment, gating a VPU for mainstream workloads that do not use 256 b vector instructions, for example, can reduce core leakage power. In an embodiment, the power gating can be done dynamically and automatically. Power will be initially off until a gated unit is needed for execution. As an example, power to a gated unit will be turned on when a 256 b instruction is detected (e.g., at allocation), or when a dedicated power-up instruction (which may be a micro-operation (μop)) is fetched as part of a microcode flow. Again, power is turned off when there is no 256 b instruction in the pipeline and there are no values to be maintained in the register file (e.g., all vector bits are zero). In some embodiments, control logic may provide for hysteresis on power-down to prevent frequent power-up/down cases.

In some embodiments, a dedicated μop may be provided to allow microcode to conditionally request a power-gate event inside long flows. In an embodiment, detector logic can detect three conditions to be present before turning the power off First, no μop/instruction is present in the pipeline that uses a gated unit. Note that an out-of-order core may speculatively have many instructions in the pipeline, waiting for execution or being replayed, which can be detected via detection logic. Second, all register file vector bits (power gated bits) are known to be zero in an embodiment that does not include a save/restore mechanism and to maximize power saving by powering off the register file only when the power gated bits are all zero. This happens for workloads that do not use vector instructions, or for kernels that zero the state (e.g., using a VZEROUPPER instruction). When all gated register bits are zero, logic can be used to force a zero on read of any value. Third, a hysteresis timer may have elapsed to prevent frequent on/off scenarios to avoid an excessive turn-on timeout. Furthermore, different units may be power gated separately, for example VPU execution units may be powered off, while register file remains powered on to maintain values.

Turn-on logic can be present to enable gradually turning on power, e.g., according to multiple stages such as a first stage to turn power on (charge up transistors), which may be a short phase in the magnitude of a few tens of clocks. In this period the core stalls the thread that has the vector instruction, allowing one or more other threads to continue. Once the turn-on time has elapsed, the stall is released and the requesting thread continues. The turn-on logic may further include voltage compensation, which can be used, e.g., in heavy floating-point (FP) applications, to adjust the voltage to compensate for IR drop on the power gate. This IR drop occurs in a high current situation and may arise on any FP workload. If such heavy workload is detected, execution can be throttled such that high current will not be drawn while the voltage is adjusted. Once voltage is adjusted (raised), the throttling is removed.

Note that this turn on stage can take several microseconds, during which the core may not be stalled to avoid dead-lock scenarios (as the power control unit is to receive information from various components of the core to enable completion of a voltage increase request). That is, a deadlock could occur if the core is stalled as the power control unit seeks to access core microcode before completing the voltage request.

Figure 4:
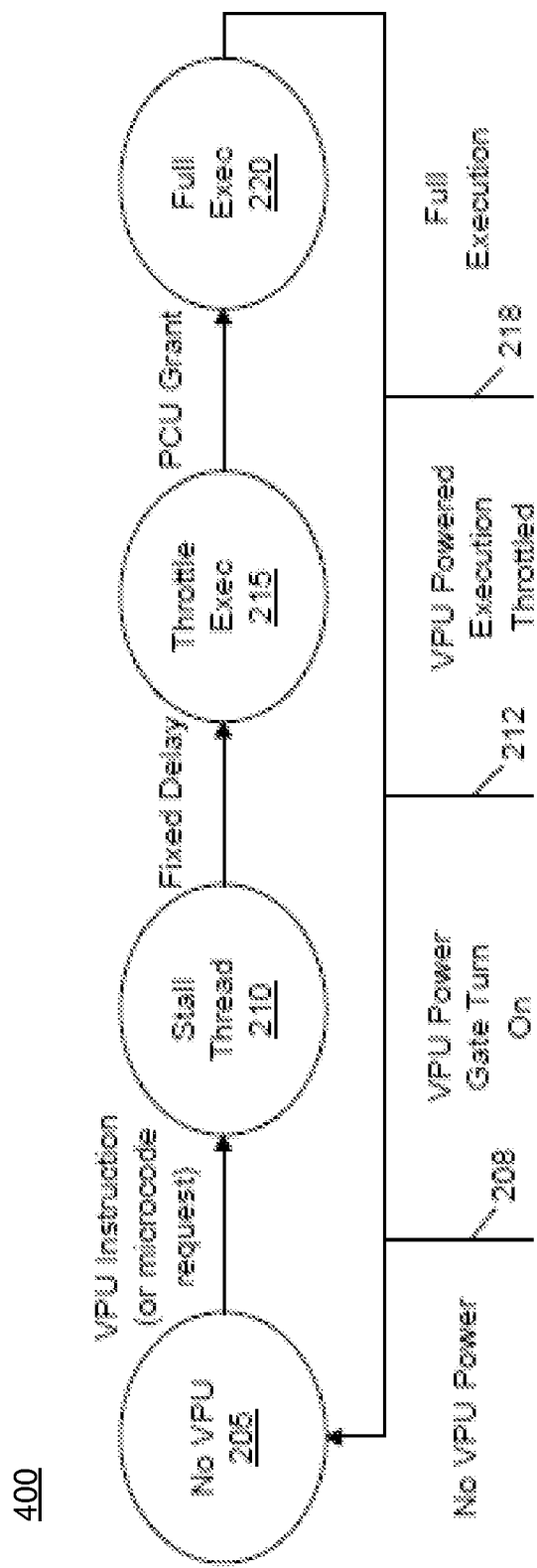
FIG. 4 is a graphical illustration of operations in performing local power gating in accordance with an embodiment of the present invention.

FIG. 4 shows a graphical illustration of operations in performing local power gating in accordance with an embodiment of the present invention. In FIG. 4, during a time epoch 400, a given locally power gated unit, e.g., a vector-based circuit such as a VPU can proceed from a power off state to a fully powered on state. More specifically, as shown at a first time instant 205, the unit is powered off, as there are no vector instructions in the machine. When such an instruction is received (e.g., is received and decoded in a front end decoder), or responsive to control instructions such as a microcode request, a power gate for this unit is turned on at a time instant 208. Then a stall state may proceed, exemplified at a time instant 210. This stalling of a thread that is to use this unit may occur during a power turn on state, which may be implemented for some number of cycles (e.g. tens of cycles). Thereafter a throttled power state may be entered at a time instant 212. During this throttled power state, the execution unit may execute instructions at a lower rate, e.g., according to a throttle rate, as shown at time instant 215. As described above, this throttling of execution may be performed when there is a high current workload detected in the processor, to avoid an undesired IR drop condition. Thereafter, a full execution state may be entered at a time instant 218, and accordingly as seen at time instant 220 full execution can occur within the vector unit. Then after a predetermined period of time corresponding to a hysteresis period in which no vector instructions are received and, no non-zero values are present in the vector register file, again power can be removed from the vector unit. Although shown at this high level in the embodiment of FIG. 4, understand that the scope of the present invention is not limited in this regard.

Figure 5:
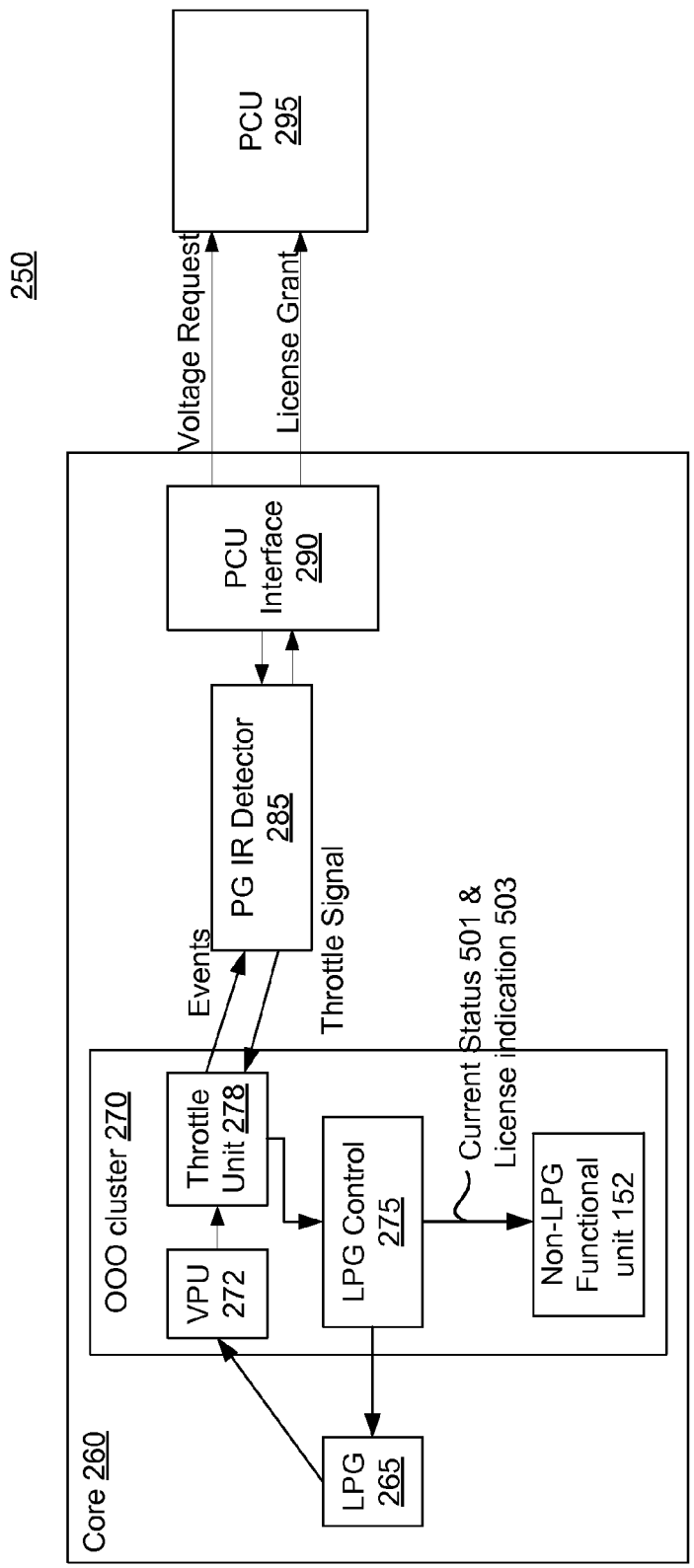
FIG. 5 is a high-level view of a portion of a processor in accordance with an embodiment of the present invention.

Referring now to FIG. 5, shown is a high-level view of a portion of a processor in accordance with an embodiment of the present invention. As shown in FIG. 5, a processor 250 includes a core 260 in communication with a power control unit (PCU) 295. In general, PCU 295 may be configured to monitor the state of the processor and control various logic of processor including one or more cores to enter into low power states when available and also to receive requests for higher power states, such as a so-called turbo mode in which the processor can execute at a higher than guaranteed frequency.

As seen in FIG. 5, core 260 may include a local power gate 265 which may control whether power is provided to a corresponding power gated logic, which in the embodiment shown may be a vector processing unit 272 of an out of order (OOO) cluster 270. As further seen, cluster 270 may include a LPG controller 275 which is used to provide control signals to enable power gate 265 to either provide or gate power to its corresponding powered unit, here VPU 272. In addition, cluster 270 may include a throttle unit 278 which may receive a control signal from an IR detector 285 which can detect a high current workload to thus throttle execution in VPU 272 until an appropriate voltage is provided to the core. As seen, execution events, e.g., from various units of the core, may be provided to IR detector 285. This detector may in turn be in communication with PCU 295, such as via a request signal to request a higher voltage when a given current consumption level exists in the core. In turn PCU 295 can receive information and generate signals to cause higher or lower voltages to be provided to the core. When an appropriate voltage is obtained, a license grant signal can be sent from PCU 295 via PCU interface 290. Note that in some implementations this license grant may be provided by the PCU without a higher voltage, based on the PCU's knowledge of overall processor power consumption. In turn, this information can be passed to IR detector 285 which in turn can communicate to throttle unit 278 to thus enable VPU 272 to no longer be throttled and operate at full capability. Although shown at this high level in the embodiment of FIG. 5, understand the scope of the present invention is not limited in this regard.

The cluster 270 may also include a non-LPG functional unit 152 that uses a current status 501 and a license indication 503 to select a code path for executing complicated macro-instructions as described herein. The non-LPG functional unit may be one or more central processing unit, one or more graphical processing units, a control unit, or the like.

Figure 6:
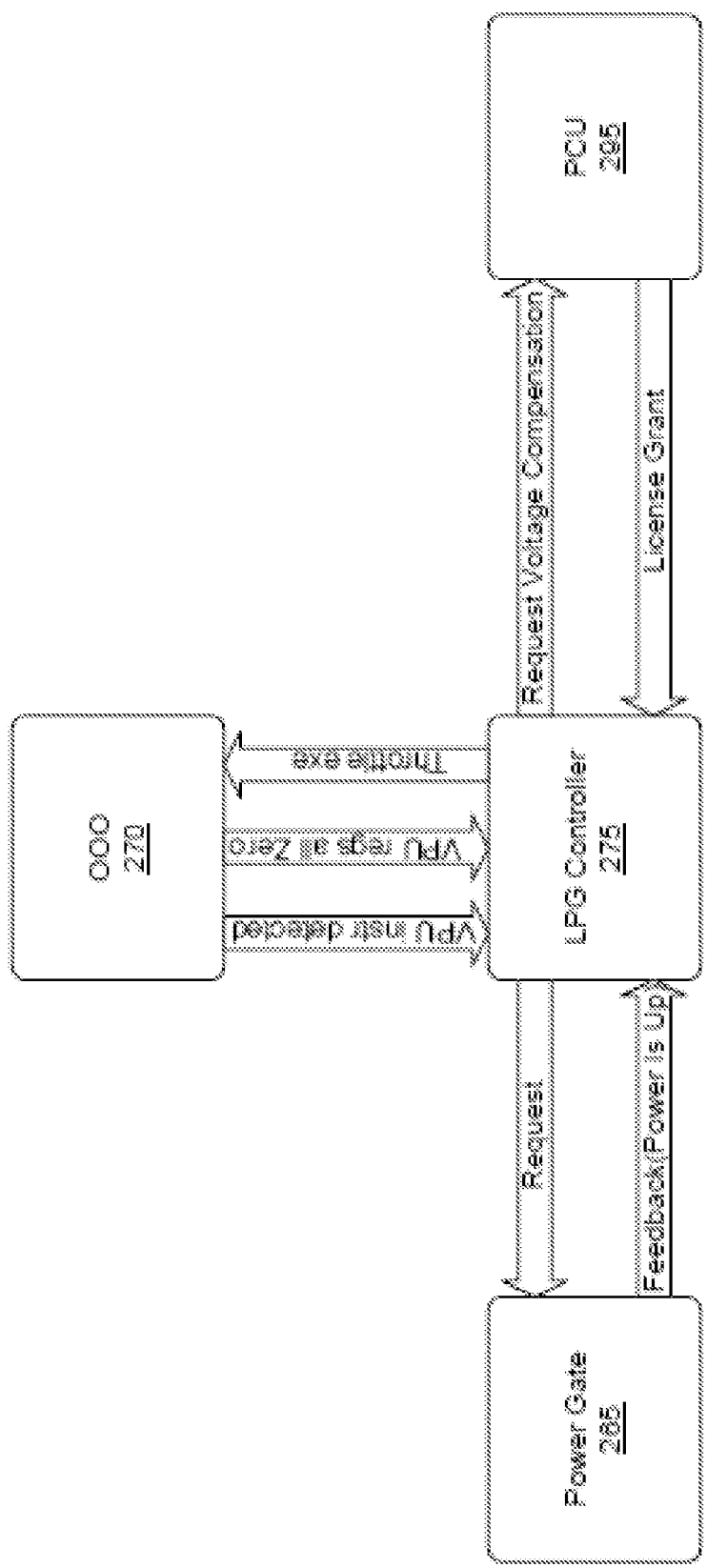
FIG. 6 is a further view of a core arrangement with a LPG controller in accordance with one embodiment of the present invention.

FIG. 6 shows a further view of this core arrangement with LPG controller 275 providing information to PCU 295 and also receiving information from the PCU. Specifically, LPG controller 275 may send a request for voltage compensation to the PCU and in turn receive a license grant that indicates that the request has been granted and the voltage is at the requested level such that a throttle of a logic unit can be removed (or that there is not a need for a higher voltage).

As further seen, LPG controller 275 may further be in communication with OOO logic 270. As seen, when a vector instruction is detected, OOO logic 270 can send a detection signal to in turn cause LPG controller 275 to send a request to a power gate circuitry 265 to power up the vector unit. In addition, OOO logic 270 can send a reset signal to LPG controller 275 which indicates that all vector registers are at a zero state such that LPG controller 275 can cause power gate circuitry 265 to disable the vector unit. Similarly, in a high current situation, LPG controller 275 can communicate a throttle signal to OOO logic 270 to thus throttle execution of one or more execution units. Note that this throttle of execution may not be performed for every turn-on and instead may be applied only based on the scenario (e.g., when a high current workload is detected). Finally as seen also in FIG. 6, a feedback signal can be sent from power gate circuitry 265 to LPG controller 275 to indicate when the power gating operation is terminated and power is returned to the vector unit. Embodiments may realize high performance by minimizing voltage ramping conditions (detecting high current cases) and putting hysteresis to minimize frequent on/off cases. Correctness and dead-lock avoidance may thus be achieved.

As described above, utilization of different resources within the core varies over time. The functionality provided by a given resource may not be exploited by all software, and thus the resource can be subjected to being frequently unused, yet still drawing leakage power. Even when executing resource-aware software, the usage pattern is often sporadic, leaving the resource idle for large amounts of time.

Control schemes for LPG may encounter some difficulty due to the physics of power gating itself. That is, there is a defined latency between initiating a power-off and actually realizing the energy savings. There is likewise latency between initiating a power-on and the resource being ready for use (possibly stalling the pipeline and saving/restoring register context). Together these represent a switching cost. This cost defines the minimum amount of time for which the resource is to be unused in order to minimize the performance impact of stalls. These stalls can vary in length depending on the level of LPG applied, from tens to hundreds of cycles or more.

A hardware-only LPG scheme cannot know when software intends to use a resource. Hardware can decide to power gate the resource, but it will be forced to stall when an instruction that uses the resource is present in a front end unit. In this way the hardware exhibits reactive, rather than just-in-time behavior.

Hardware solutions can aim to minimize performance impact using a counter. For example, if powering off/on the VPU takes 100 cycles to go between LC6 (the lowest power level) and LC0 (fully powered-on), it can be guaranteed that any region of execution that does not use the VPU for 20,000 cycles can be forced to LC6 with less than 1% performance penalty (200 cycles for LC6 to LC0 and back). The scheme can thus count non-VPU instructions and initiate LC6 when the counter reaches 20,000. This scheme can miss many opportunities for gating when non-VPU windows of execution are 20,000 cycles or less. If all windows happen to be exactly 20,000 cycles, the scheme will always pay the 200 cycle stalling cost and save no power at all. Windows larger than 20,000 will save power only after the first 20,000 cycles.

The same situation occurs with finer-grained windows of non-VPU usage and less aggressive LPG modes. LC3, for example, may save less power than LC6 but only incur a 16 cycle stall to return to LC0. LC3 retains register bank state, and therefore consumes much less switching time. A VPU-heavy workload, which has only small non-VPU regions, will suffer in the same way with a counter-based LC3 scheme.

In various embodiments, the power savings of LPG can be balanced against the power cost of its controlling scheme. Aggressive use of LPG can save additional power over that offered by a hardware only scheme. To realize this aggressive LPG control, embodiments may provide a non-VPU oracle to control gating whilst minimizing stall cycles.

Embodiments can be applied to any dynamic binary translation (DBT) system, such as a hardware/software co-designed processor. In such a processor, software is executed by translating it at the basic-block level into code of a native instruction set. This translation is performed by a software layer, which executes on the core itself. The software layer is therefore a dynamic binary translator. An analogous situation is that of a Java just-in-time compiler, which translates Java bytecode into native binary code understood by the underlying machine.

In such embodiments, the binary translator can perform predictions and instruct hardware when to enter and exit LPG states. One embodiment of this prediction is by means of event tracker hardware, which serves as the example for this discussion. Another embodiment is by means of static and/or dynamic analysis of the program to determine regions of code that do not require a given resource.

Some embodiments can be implemented in a hardware/software co-design processor that provides for optimization of received code for the processor and can leverage knowledge of the units used in execution of such code to permit aggressive local power gating in accordance with an embodiment of the present invention.

In another embodiment, a processor and a memory, which in one embodiment may be a system memory such as a dynamic random access memory (DRAM). The processor may have a given micro-architecture and may be coupled to memory by way of, e.g., a point-to-point interconnect, bus or in other such manner. The processor may include front end units such as an instruction fetcher that can receive instructions directly from the OS or application programs. These instructions, which may be macro-instructions, e.g., corresponding to user-level instructions of an application program can be decoded using a decode unit, which may operate to decode the instructions and access corresponding μops, e.g., present in a microcode storage of processor. In turn, decode unit may provide the μops to one or more execution units, which may include various arithmetic logic units (ALUs), vector processing units, specialized hardware and other types of computation units. Results from these instructions may be provided to a retirement unit, which operates to retire the instructions to thus store the results to an architectural state of the processor in program order, if no fault or exceptions occurred. While described as an in-order machine, embodiments can equally be implemented using an out-of-order machine.

Figure 7:
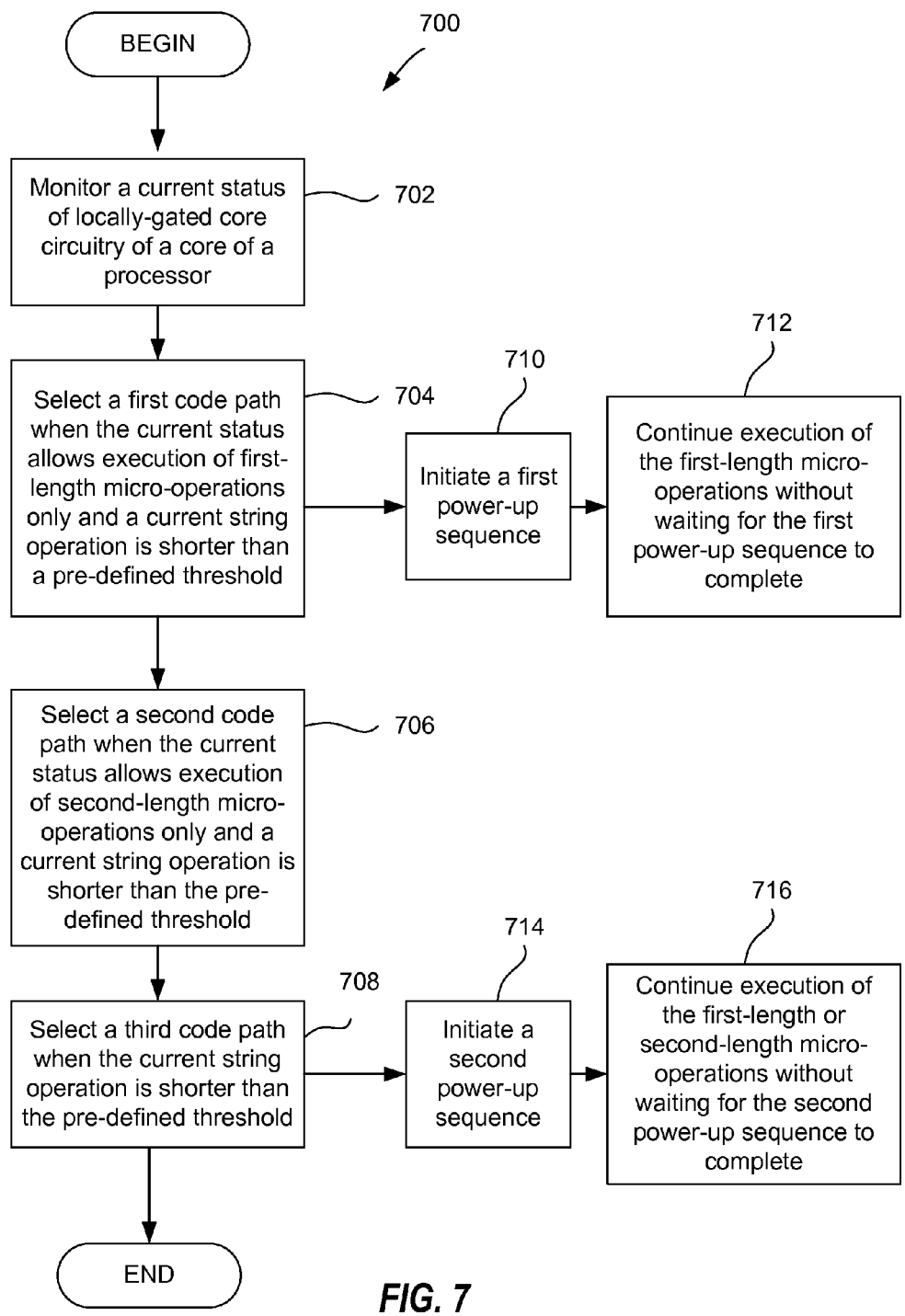
FIG. 7 is a flow diagram illustrating a method of operating a processor executing power-aware operations in accordance with one embodiment of the present invention.

FIG. 7 is a flow diagram illustrating a method 700 of operating a processor executing power-aware operations in accordance with one embodiment of the present invention. Method 700 may be performed by processing logic that may comprise hardware (e.g., circuitry, dedicated logic, programmable logic, microcode, etc.), software (such as instructions), firmware or a combination thereof. In one embodiment, method 700 is performed by microcode 90 of FIG. 1. In another embodiment, the method 700 is performed by microcode 133 of FIG. 3. Alternatively, other components of the computing systems described herein may perform some or all of the operations of the method 700.

Referring to FIG. 7, the method 700 begins by the processing logic monitoring a current status of a locally-gated core circuitry of a core of the processor (block 702). The locally-gated core circuitry is power gated by local power gate (LPG) hardware. The processing logic selects a first code path for execution when the current status allows execution of micro-operations of a first length only and a current string operation is shorter in length than a pre-defined threshold (block 704). The processing logic selects a second code path for execution when the current status allows execution of micro-operations of a second length only and the current string operation is shorter in length than the pre-defined threshold (block 706). The processing logic selects a third code path for execution of micro-operations of a third length when the current string operation is longer in length than the pre-defined threshold (block 708). At a beginning of the first code path, the processing logic initiates a first power-up sequence by the LPG hardware to power up the locally-gated core circuitry for execution of the micro-operations of the second length (block 710), and continues execution of the micro-operations of the first length without waiting for the first power-up sequence to complete (block 712). At a beginning of the third code path, the processing logic initiates a second power-up sequence by the LPG hardware to power up the locally-gated core circuitry for execution of the micro-operations of the third length (block 714), and continues execution of the micro-operations of at least the first length or the second length without waiting for the second power-up sequence to complete (block 716). Additional operations may be performed to jump between the first, second and third code paths as described herein.

In a further embodiment, the processing logic checks a throttling status of a micro-operation scheduler at the beginning of the third code path. When the micro-operation scheduler is throttling, the processing logic continues execution of the micro-operations of the second length. When the micro-operation scheduler is not throttling, the processing logic continues execution of the micro-operations of the third length.

In a further embodiment, the processing logic programs a jump-table register to point to the first code path with a first execution loop of the first length when the first code path is selected, programs the jump-table register to point to the second code path with a second execution loop of the second length when the second code path is selected, and programs the jump-table register to point to the third code path with a third execution loop of the third length when the third code path is selected.

In a further embodiment, the processing logic maps a power level indication of the LPG hardware to a first zero-penalty, mode-based-branch micro-operation that allows execution of the first power-aware operation using the micro-operations of the first length in the first code path until the second power-up sequence completes. The processing logic continues the execution of the first power-aware operation using the micro-operations of the third length in the third code path. In a further embodiment, the processing logic maps a current-supply license indication to a second zero-penalty, mode-based-branch micro-operation that allows execution of the first power-aware operation using micro-operations of the second length in the second code path.

FIG. 8A is a block diagram illustrating a micro-architecture for a processor 800 that implements power-aware operations with LPG interfaces according to one embodiment. Specifically, processor 800 depicts an in-order architecture core and a register renaming logic, out-of-order issue/execution logic to be included in a processor according to at least one embodiment of the disclosure.

Processor 800 includes a front end unit 830 coupled to an execution engine unit 850, and both are coupled to a memory unit 870. The processor 800 may include a reduced instruction set computing (RISC) core, a complex instruction set computing (CISC) core, a very long instruction word (VLIW) core, or another alternative core type. As yet another option, processor 800 may include a special-purpose core, such as, for example, a network or communication core, compression engine, graphics core, or the like. In one embodiment, processor 800 may be a multi-core processor or may be part of a multi-processor system.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 860. The decode unit 860 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 860 may be implemented using various different mechanisms. Examples of suitable mechanisms include, but are not limited to, look-up tables, hardware implementations, programmable logic arrays (PLAs), microcode stores, such as microcode read only memories (ROMs), etc. The instruction cache unit 834 is further coupled to the memory unit 870. The decode unit 860 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations (RS), central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 858 is overlapped by the retirement unit 854 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which may include a data prefetcher 880, a data TLB unit 872, a data cache unit (DCU) 874, and a level 2 (L2) cache unit 876, to name a few examples. In some embodiments DCU 874 is also known as a first level data cache (L1 cache). The DCU 874 may handle multiple outstanding cache misses and continue to service incoming stores and loads. It also supports maintaining cache coherency. The data TLB unit 872 is a cache used to improve virtual address translation speed by mapping virtual and physical address spaces. In one exemplary embodiment, the memory access units 864 may include a load unit, a store address unit, and a store data unit, each of which is coupled to the data TLB unit 872 in the memory unit 870. The L2 cache unit 876 may be coupled to one or more other levels of cache and eventually to a main memory.

In one embodiment, the data prefetcher 880 speculatively loads/prefetches data to the DCU 874 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 800 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 8B is a block diagram illustrating an in-order pipeline and a register renaming stage, out-of-order issue/execution pipeline implemented by processing device 800 of FIG. 8A according to some embodiments of the disclosure. The solid lined boxes in FIG. 8B illustrate an in-order pipeline, while the dashed lined boxes illustrates a register renaming, out-of-order issue/execution pipeline. In FIG. 8B, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824. In some embodiments, the ordering of stages 802-824 may be different than illustrated and are not limited to the specific ordering shown in FIG. 8B.

Figure 9:
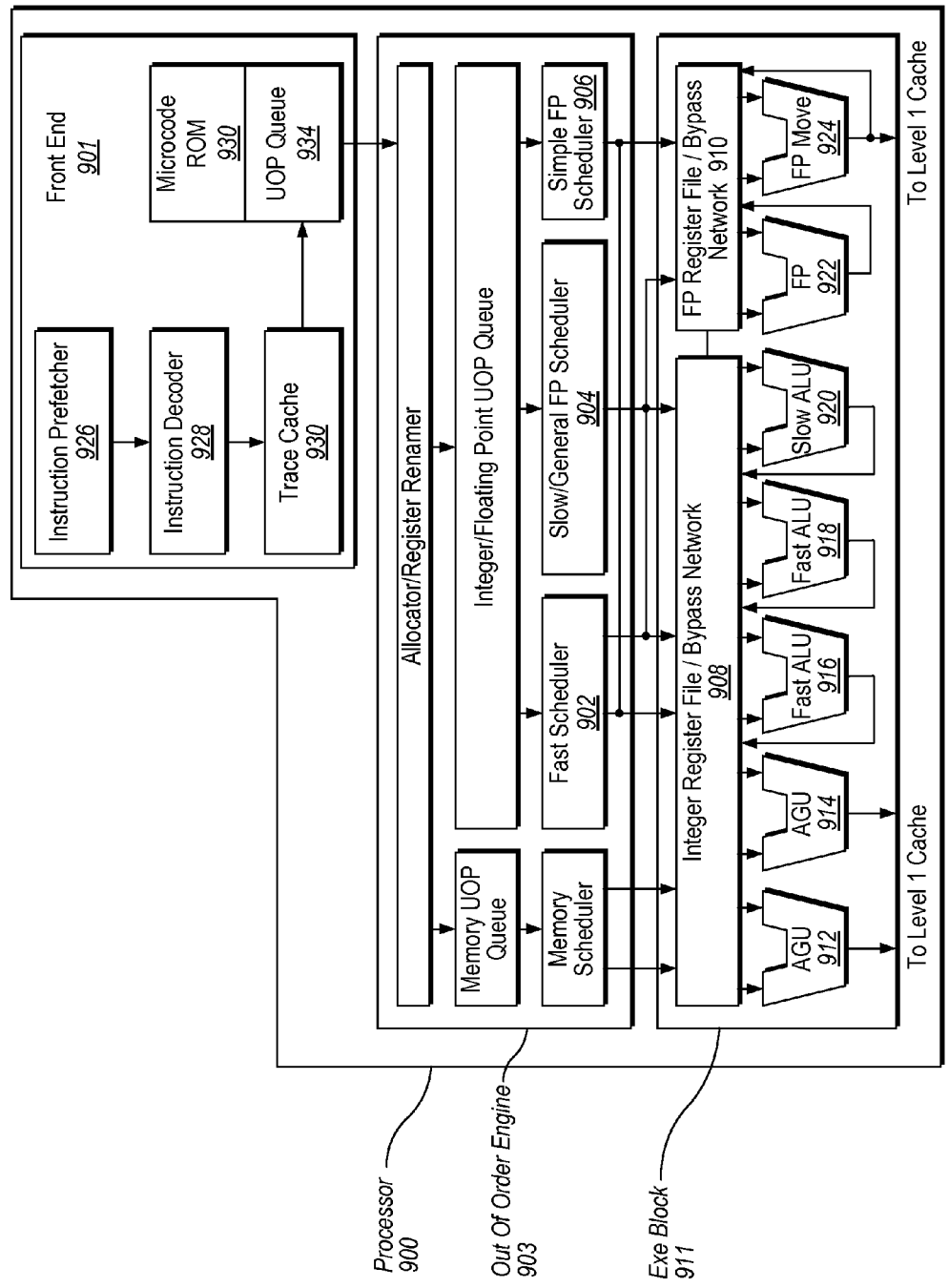
FIG. 9 illustrates a block diagram of the micro-architecture for a processor that includes logic circuits to perform power-aware operations power-aware operations with LPG interfaces according to one embodiment.

FIG. 9 illustrates a block diagram of the micro-architecture for a processor 900 that includes logic circuits to perform power-aware operations with LPG interfaces according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 901 is the part of the processor 900 that fetches instructions to be executed and prepares them to be used later in the processor pipeline.

The front end 901 may include several units. In one embodiment, the instruction prefetcher 916 fetches instructions from memory and feeds them to an instruction decode unit 918, which in turn decodes or interprets them. For example, in one embodiment, the decode unit 918 decodes a received instruction into one or more operations called "microinstructions" or "micro-operations" (also called micro op or µops) that the machine can execute. In other embodiments, the decode unit parses the instruction into an opcode and corresponding data and control fields that are used by the micro-architecture to perform operations in accordance with one embodiment. In one embodiment, the trace cache 930 takes decoded µops and assembles them into program ordered sequences or traces in the µops queue 934 for execution. When the trace cache 930 encounters a complex instruction, the microcode ROM 932 provides the µops needed to complete the operation.

Some instructions are converted into a single micro-op, whereas others need several micro-ops to complete the full operation. In one embodiment, if more than four micro-ops are needed to complete an instruction, the decode unit 918 accesses the microcode ROM 932 to do the instruction. For one embodiment, an instruction can be decoded into a small number of micro ops for processing at the instruction decode unit 918. In another embodiment, an instruction can be stored within the microcode ROM 932 should a number of micro-ops be needed to accomplish the operation. The trace cache 930 refers to an entry point programmable logic array (PLA) to determine a correct micro-instruction pointer for reading the micro-code sequences to complete one or more instructions in accordance with one embodiment from the micro-code ROM 932. After the microcode ROM 932 finishes sequencing micro-ops for an instruction, the front end 901 of the machine resumes fetching micro-ops from the trace cache 930.

The out-of-order execution engine 903 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each µop needs in order to execute. The register renaming logic renames logic registers onto entries in a register file. The allocator also allocates an entry for each µop in one of the two µop queues, one for memory operations and one for non-memory operations, in front of the instruction schedulers: memory scheduler, fast scheduler 902, slow/general floating point scheduler 904, and simple floating point scheduler 906. The µop schedulers 902, 904, 906, determine when a µop is ready to execute based on the readiness of their dependent input register operand sources and the availability of the execution resources the µops need to complete their operation. The fast scheduler 902 of one embodiment can schedule on each half of the main clock cycle while the other schedulers can only schedule once per main processor clock cycle. The schedulers arbitrate for the dispatch ports to schedule µops for execution.

Register files 908, 910, sit between the schedulers 902, 904, 906, and the execution units 912, 914, 916, 918, 910, 912, 914 in the execution block 911. There is a separate register file 908, 910, for integer and floating point operations, respectively. Each register file 908, 910, of one embodiment also includes a bypass network that can bypass or forward just completed results that have not yet been written into the register file to new dependent µops. The integer register file 908 and the floating point register file 910 are also capable of communicating data with the other. For one embodiment, the integer register file 908 is split into two separate register files, one register file for the low order 32 bits of data and a second register file for the high order 32 bits of data. The floating point register file 910 of one embodiment has 128 bit wide entries because floating point instructions typically have operands from 64 to 128 bits in width.

The execution block 911 contains the execution units 912, 914, 916, 918, 910, 912, 914, where the instructions are actually executed. This section includes the register files 908, 910, which store the integer and floating point data operand values that the microinstructions need to execute. The processor 900 of one embodiment is comprised of a number of execution units: address generation unit (AGU) 912, AGU 914, fast ALU 916, fast ALU 918, slow ALU 910, floating point ALU 912, floating point move unit 914. For one embodiment, the floating point execution blocks 912, 914, execute floating point, MMX, SIMD, and SSE, or other operations. The floating point ALU 912 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 916, 918. The fast ALUs 916, 918, of one embodiment can execute fast operations with an effective latency of half a clock cycle. For one embodiment, most complex integer operations go to the slow ALU 910 as the slow ALU 910 includes integer execution hardware for long latency type of operations, such as a multiplier, shifts, flag logic, and branch processing. The AGUs 912, 914 executes memory load/store operations. For one embodiment, the integer ALUs 916, 918, 910, are described in the context of performing integer operations on 64 bit data operands. In alternative embodiments, the ALUs 916, 918, 910, can be implemented to support a variety of data bits including 16, 32, 128, 256, etc. Similarly, the floating point units 912, 914, can be implemented to support a range of operands having bits of various widths. For one embodiment, the floating point units 912, 914, can operate on 128 bits wide packed data operands in conjunction with SIMD and multimedia instructions.

In one embodiment, the µops schedulers 902, 904, 906, dispatch dependent operations before the parent load has finished executing. As µops are speculatively scheduled and executed in processor 900, the processor 900 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations. The processor 900 also includes the firmware, microcode, LPG interfaces, or any combination thereof, as described herein. The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 10:
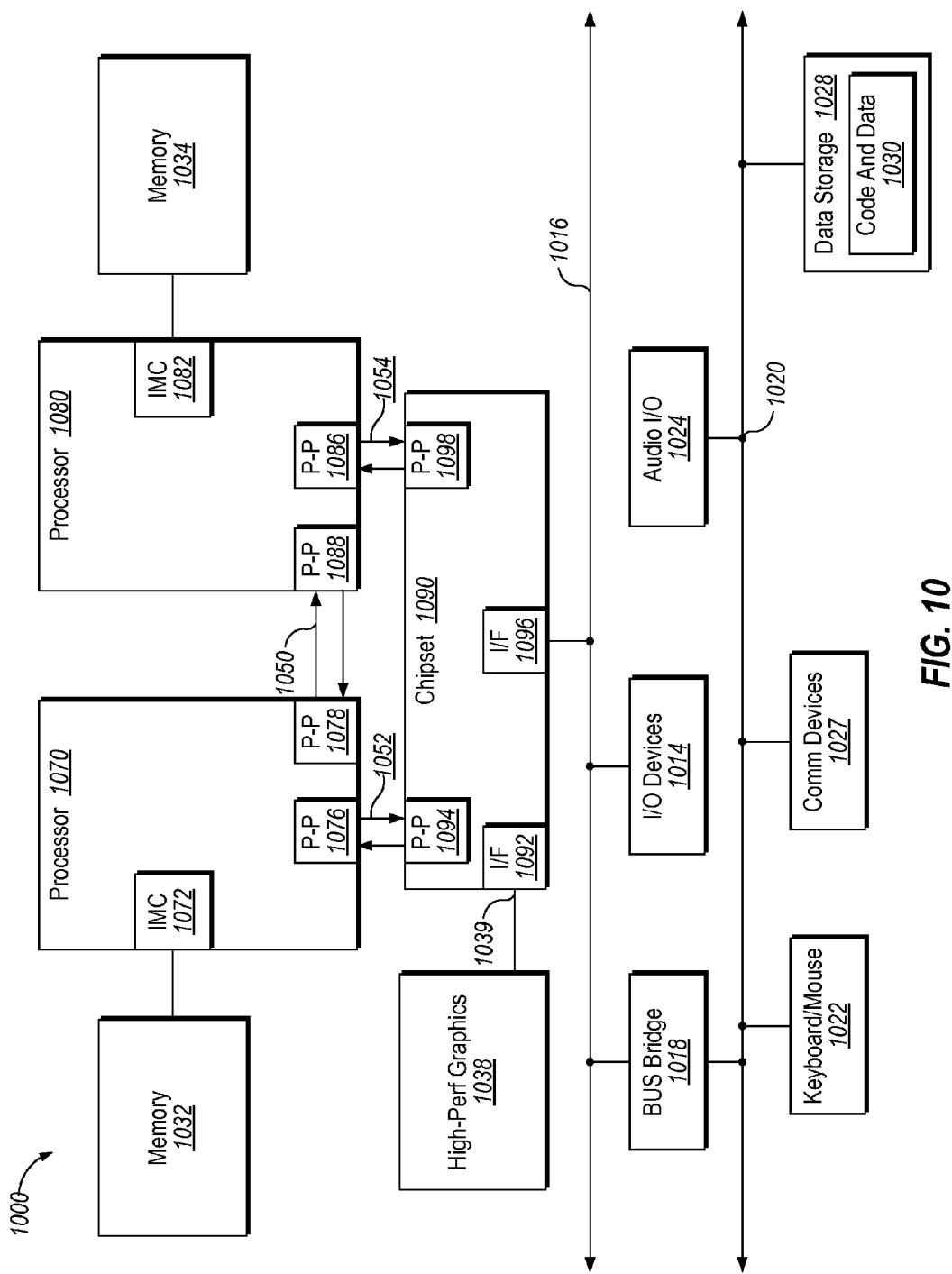
FIG. 10 is a block diagram of a computer system according to one implementation.

Embodiments may be implemented in many different system types. Referring now to FIG. 10, shown is a block diagram of a multiprocessor system 1000 in accordance with an implementation. As shown in FIG. 10, multiprocessor system 1000 is a point-to-point interconnect system, including a first processor 1070 and a second processor 1080 coupled via a point-to-point interconnect 1050. The multiprocessor system 1000 also includes the firmware, microcode, LPG interfaces, or any combination thereof, as described herein. As shown in FIG. 10, each of processors 1070 and 1080 may be multicore processors, including first and second processor cores (i.e., processor cores 1074a and 1074b and processor cores 1084a and 1084b), although potentially many more cores may be present in the processors. The processors each may include write mode logics in accordance with an embodiment of the present.

While shown with two processors 1070, 1080, it is to be understood that the scope of the present disclosure is not so limited. In other implementations, one or more additional processors may be present in a given processor.

Processors 1070 and 1080 are shown including integrated memory controller units 1082 and 1082, respectively. Processor 1070 also includes as part of its bus controller units point-to-point (P-P) interfaces 1076 and 1088; similarly, second processor 1080 includes P-P interfaces 1086 and 1088. Processors 1070, 1080 may exchange information via a point-to-point (P-P) interface 1050 using P-P interface circuits 1088, 1088. As shown in FIG. 10, IMCs 1082 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018, which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device, which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
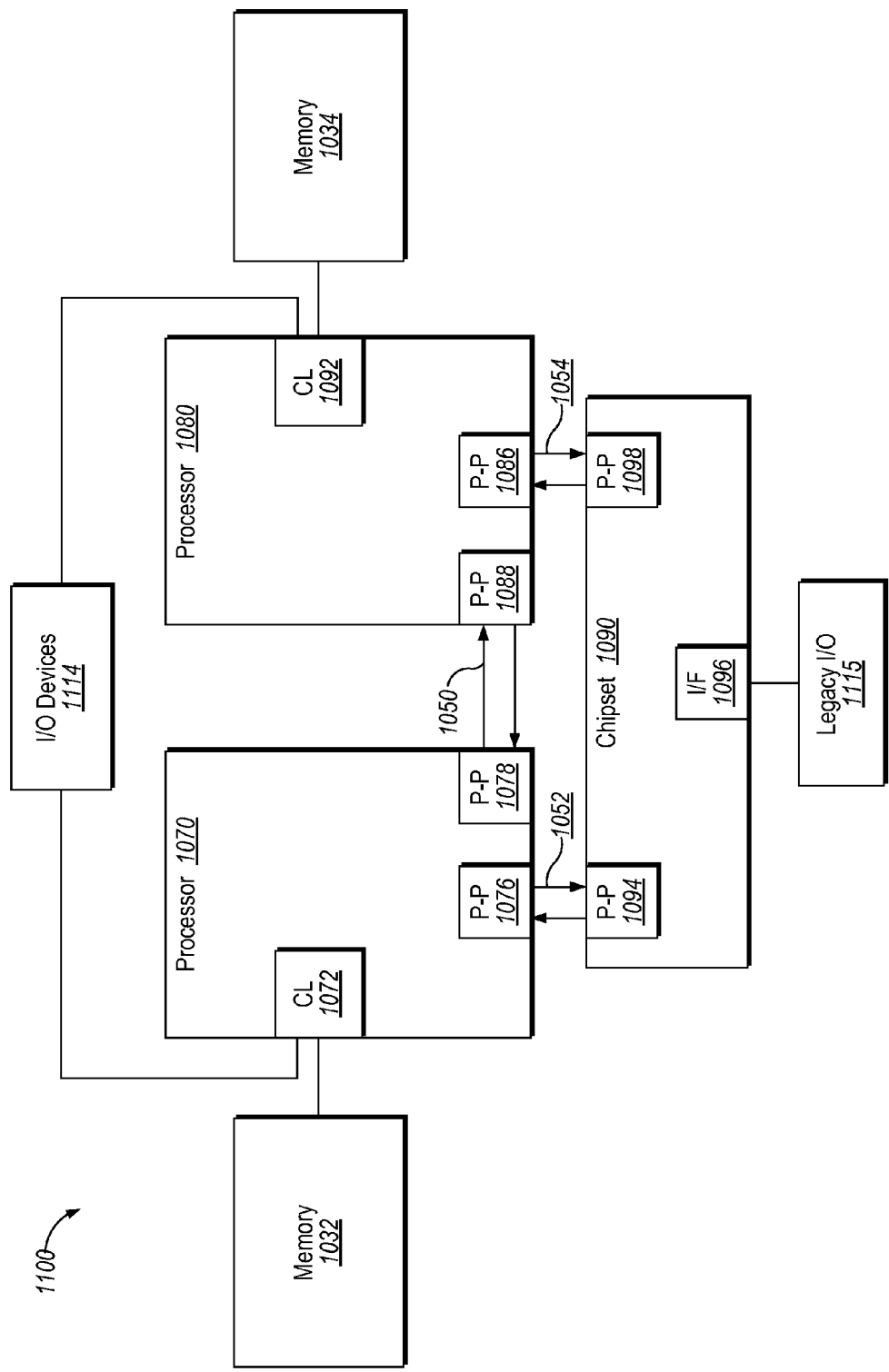
FIG. 11 is a block diagram of a computer system according to another implementation.

Referring now to FIG. 11, shown is a block diagram of a third system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1170, 1180 may include integrated memory and I/O control logic ("CL") 1172 and 1182, respectively. For at least one embodiment, the CL 1172, 1182 may include integrated memory controller units such as described herein. In addition. CL 1172, 1182 may also include I/O control logic. FIG. 11 illustrates that the memories 1132, 1134 are coupled to the CL 1172, 1182, and that I/O devices 1114 are also coupled to the control logic 1172, 1182. Legacy I/O devices 1115 are coupled to the chipset 1190. The third system 1100 also includes the firmware, microcode, LPG interfaces, or any combination thereof, as described herein.

Figure 12:
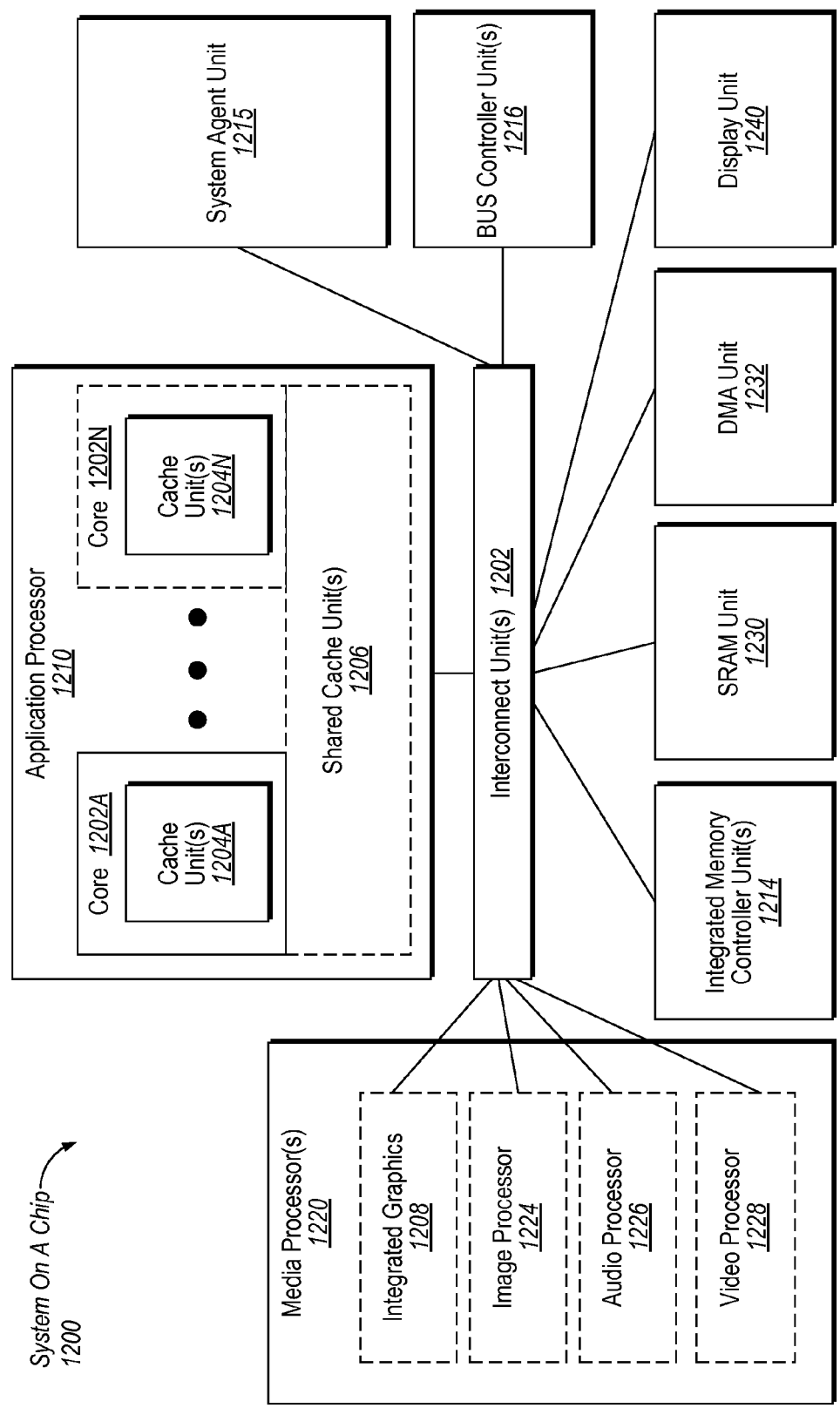
FIG. 12 is a block diagram of a system-on-a-chip according to one implementation.

FIG. 12 is an exemplary system on a chip (SoC) that may include one or more of the cores 1202. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 12, shown is a block diagram of a SoC 1200 in accordance with an embodiment of the present disclosure. Similar elements in FIG. 5 bear like reference numerals. Also, dashed lined boxes are features on more advanced SoCs. In FIG. 12, an interconnect unit(s) 1202 is coupled to: an application processor 1210 which includes a set of one or more cores 1202A-N and shared cache unit(s) 1206; a system agent unit 1215; a bus controller unit(s) 1216; an integrated memory controller unit(s) 1214; a set or one or more media processors 1220 which may include integrated graphics logic 1208, an image processor 1224 for providing still and/or video camera functionality, an audio processor 1226 for providing hardware audio acceleration, and a video processor 1228 for providing video encode/decode acceleration; a static random access memory (SRAM) unit 1230; a direct memory access (DMA) unit 1232; and a display unit 1240 for coupling to one or more external displays. The SoC 1200 also includes the firmware, microcode, LPG interfaces, or any combination thereof, as described herein.

Figure 13:
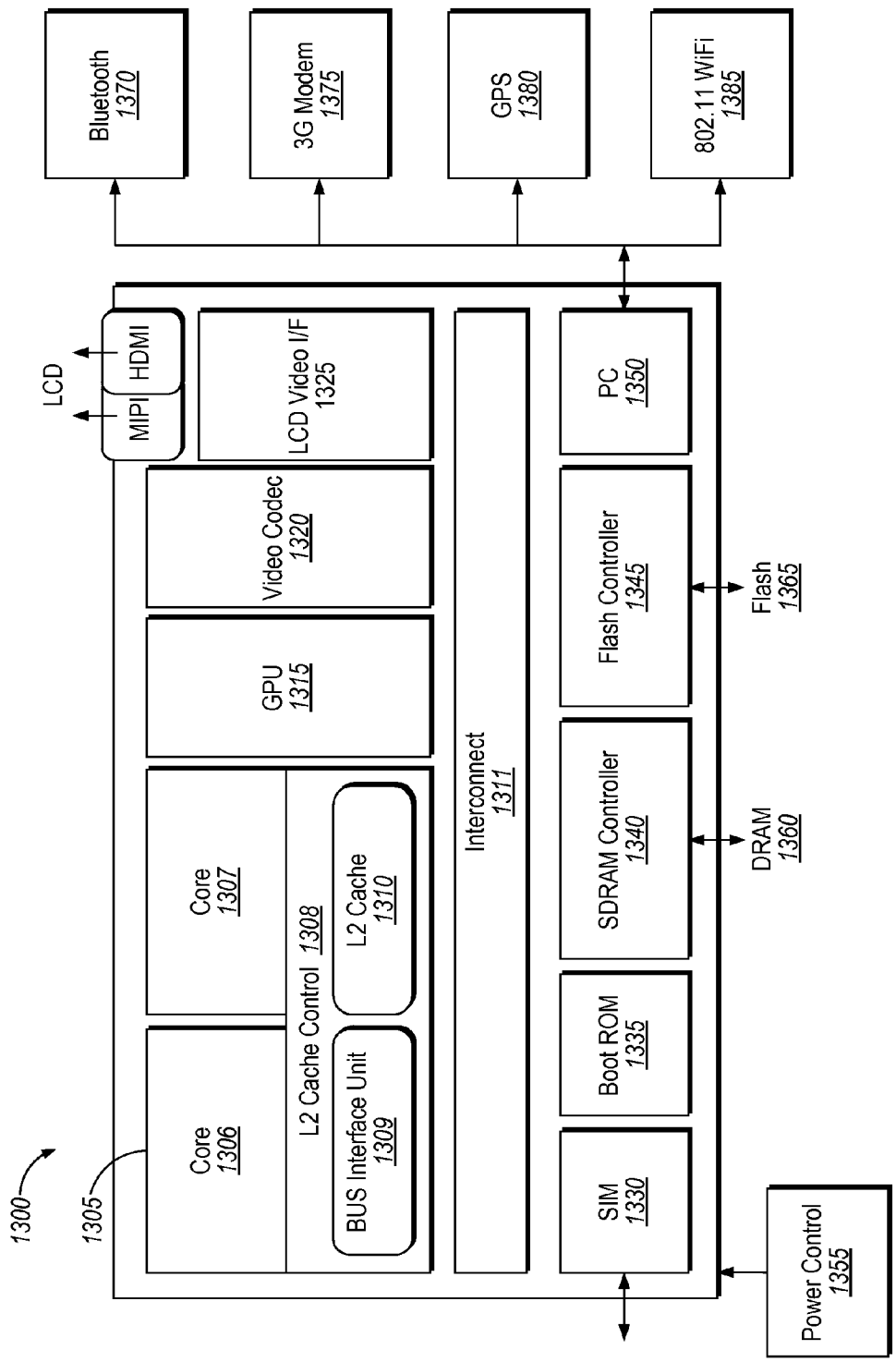
FIG. 13 illustrates another implementation of a block diagram for a computing system.

Turning next to FIG. 13, an embodiment of a system on-chip (SoC) design in accordance with embodiments of the disclosure is depicted. As an illustrative example, SoC 1300 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SoC 1300 includes 2 cores—1306 and 1307. Similar to the discussion above, cores 1306 and 1307 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300. Interconnect 1311 includes an on-chip interconnect, such as an IOSF, AMBA, or other interconnects discussed above, which can implement one or more aspects of the described disclosure.

Interconnect 1311 provides communication channels to the other components, such as a Subscriber Identity Module (SIM) 1330 to interface with a SIM card, a boot ROM 1335 to hold boot code for execution by cores 1306 and 1307 to initialize and boot SoC 1300, a SDRAM controller 1340 to interface with external memory (e.g. DRAM 1360), a flash controller 1345 to interface with non-volatile memory (e.g. Flash 1365), a peripheral control 1350 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the embodiments described herein.

In addition, the system illustrates peripherals for communication, such as a Bluetooth module 1370, 3G modem 1375, GPS 1380, and Wi-Fi 1385. Note as stated above, a UE includes a radio for communication. As a result, these peripheral communication modules may not all be included. However, in a UE some form of a radio for external communication should be included.

Figure 14:
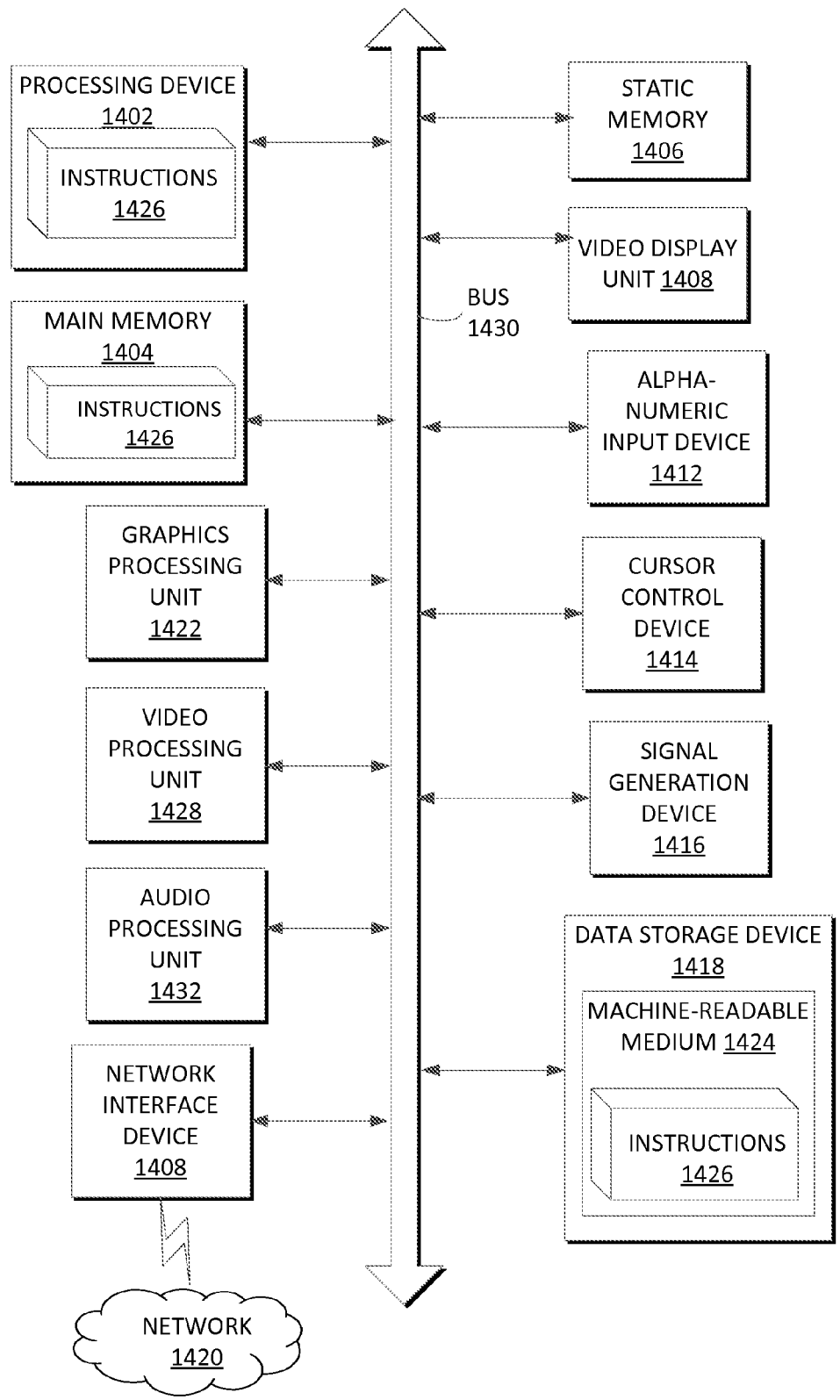
FIG. 14 illustrates another implementation of a block diagram for a computing system.

FIG. 14 illustrates a diagrammatic representation of a machine in the example form of a computing system 1400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1400 includes a processing device 1402, main memory 1404 (e.g., read-only memory (ROM), flash memory, dynamic random access memory (DRAM) (such as synchronous DRAM (SDRAM) or DRAM (RDRAM), etc.), a static memory 1406 (e.g., flash memory, static random access memory (SRAM), etc.), and a data storage device 1418, which communicate with each other via a bus 1430.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. In one embodiment, processing device 1402 may include one or processing cores. The processing device 1402 is configured to execute the processing logic 1426 for performing the operations discussed herein. In one embodiment, processing device 1402 can be part of any of the computing systems described herein. Alternatively, the computing system 1400 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1400 may further include a network interface device 1408 communicably coupled to a network 1420. The computing system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), a signal generation device 1416 (e.g., a speaker), or other peripheral devices. Furthermore, computing system 1400 may include a graphics processing unit 1422, a video processing unit 1428 and an audio processing unit 1432. In another embodiment, the computing system 1400 may include a chipset (not illustrated), which refers to a group of integrated circuits, or chips, that are designed to work with the processing device 1402 and controls communications between the processing device 1402 and external devices. For example, the chipset may be a set of chips on a motherboard that links the processing device 1402 to very high-speed devices, such as main memory 1404 and graphic controllers, as well as linking the processing device 1402 to lower-speed peripheral buses of peripherals, such as USB, PCI or ISA buses.

The data storage device 1418 may include a computer-readable storage medium 1424 on which is stored software 1426 embodying any one or more of the methodologies of functions described herein. The software 1426 may also reside, completely or at least partially, within the main memory 1404 as instructions 1426 and/or within the processing device 1402 as processing logic 1426 during execution thereof by the computing system 1400; the main memory 1404 and the processing device 1402 also constituting computer-readable storage media.

The computer-readable storage medium 1424 may also be used to store instructions 1426 utilizing the processing device 1402, such as described with respect to FIG. 1, and/or a software library containing methods that call the above applications. While the computer-readable storage medium 1424 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

In Example 1, a processor comprises: locally-gated circuitry of a core; main core circuitry of the core, the main core comprising a decode unit and an execution unit; and local power gate (LPG) hardware coupled to the locally-gated circuitry and the main core circuitry, the LPG hardware to power gate the locally-gated circuitry according to local power states of the LPG hardware. The decode unit is operative to decode a first instruction of a set of instructions to perform a first power-aware operation of a specified length, the first instruction to compute an execution code path for execution. The execution unit is operative to: execute a first micro-operation to monitor a current local power state of the LPG hardware; execute a second micro-operation to select one of a plurality of code paths based on the current local power state, the specified length, and a specified threshold; and execute a third micro-operation in the selected one of the plurality of code paths to issue a hint to the LPG hardware to power up the locally-gated circuitry and to continue execution of the first power-aware operation without waiting for the locally-gated circuitry to be powered up.

In Example 2, the subject matter of Example 1 the second micro-operation is operative to: program a jump-table register to point to a first-length code path of the plurality of code paths when the current local power state allows execution of micro-operations of the first length and the specified length is shorter than the specified threshold; program the jump-table register to point to a second-length code path of the plurality of code paths when the current local power state allows execution of the micro-operations of the second length and the specified length is shorter than the specified threshold, the second length being greater than the first length; and program the jump-table register to point to a third-length code path of the plurality of code paths when the specified length is longer than the specified threshold, the third length being greater than the second length, wherein the first micro-operation is further operative to map a power level indication of the current lower power state to a first mode-based-branch micro-operation that allows execution in the first-code path until the locally-gated circuitry is powered up and then continue the execution in the third-length code path.

In Example 3, in the subject matter of any one of Examples 1-2, when the first-length code path is selected, the execution unit is further operative to: execute the third micro-operation at a beginning of the first-length code path to initiate a power-up sequence by the LPG hardware to power up the locally-gated circuitry to execute a second set of subsequent micro-operations of the second length in the second-length code path; and without waiting for the power-up sequence to complete, execute a first set of subsequent micro-operations of the first length in the second-length code path.

In Example 4, in the subject matter of any one of Examples 1-3, the execution unit is further operative to execute the second set of subsequent micro-operations of the second length in the second-length code path when the power-up sequence is completed.

In Example 5, in the subject matter of any one of Examples 1-4, when the second-length code path is selected, the execution unit is further operative to execute subsequent micro-operations of the second length in the second-length code path.

In Example 6, in the subject matter of any one of Examples 1-5, when the third-length code path is selected, the execution unit is further operative to: execute the third micro-operation at a beginning of the third-length code path to initiate a power-up sequence by the LPG hardware to power up the locally-gated circuitry to execute a second set of subsequent micro-operations of the third length in the third-length code path; and without waiting for the power-up sequence to complete, execute a first set of subsequent micro-operations of the first length in the third-length code path.

In Example 7, in the subject matter of any one of Examples 1-6 the execution unit is further operative to execute the second set of subsequent micro-operations of the third length in the third-length code path when the power-up sequence is completed.

In Example 8, in the subject matter of any one of Examples 1-7, when the third-length code path is selected, the execution unit is further operative to: execute the third micro-operation at a beginning of the third-length code path to initiate a power-up sequence by the LPG hardware to power up the locally-gated circuitry to execute a second set of subsequent micro-operations of the third length in the third-length code path; execute a fourth micro-operation to check for an insufficient current supply license in which a micro-operation scheduler throttles execution by dispatching the micro-operations at a specified clock cycle instead of every clock cycle, wherein the first micro-operation is further operative to map a current-supply license indication to a second mode-based-branch micro-operation that allows execution of the first power-aware operation in the second-length loop when there is insufficient current supply license and allows execution of the first power-aware operation in the third-length loop when there is sufficient current supply license; when there is insufficient current supply license, execute the first set of subsequent micro-operations of the second length in the second-length code path; and execute the second set of subsequent micro-operations of the third length in the third-length code path when the power-up sequence is completed.

In Example 9, the subject matter of any one of Examples 1-8, the first power-aware operation is a repeat (REP) string operation, wherein the first-length code path is a 16-byte code path, the second-length code path is a 32-byte code path, and the third-length code path is a 64-byte code path.

In Example 10, in the subject matter of any of Examples 1-9, the decode unit is operative to decode a second instruction of the set of instructions to compute an early tail condition, wherein the execution unit is further operative to: execute a sixth micro-operation to compute the early tail condition based on the second instruction; and execute the second micro-operation to select one of the plurality of code paths when there is no early tail in view of the early tail condition; and not execute the second micro-operation when there is an early tail in the view of the early tail condition.

Various embodiments may have different combinations of the structural features described above.

In Example 11, a processor comprises a microcode store of a core, the microcode store to store microcode; local power gate (LPG) hardware coupled to locally-gated circuitry of the core; and main core circuitry of the core, wherein the core is operative to execute the microcode to: monitor a current status of the locally-gated circuitry; select a first code path of a plurality of code paths for execution when the current status allows execution of micro-operations of a first length only and a current string operation is shorter in length than a pre-defined threshold; select a second code path of the plurality of code paths for execution when the current status allows execution of the micro-operations of a second length only and the current string operation is shorter in length than the pre-defined threshold; select a third code path of the plurality of code paths for execution of the micro-operations of a third length when the current string operation is longer in length than the pre-defined threshold; at a beginning of the first code path, initiate a first power-up sequence by the LPG hardware to power up the locally-gated circuitry for execution of the micro-operations of the second length and continue execution of the micro-operations of the first length without waiting for the first power-up sequence to complete; and at a beginning of the third code path, initiate a second power-up sequence by the LPG hardware to power up the locally-gated circuitry for execution of the micro-operations of the third length and continue execution of the micro-operations of at least the first length or the second length without waiting for the second power-up sequence to complete.

In Example 12, in the subject matter of Example 11, the microcode is further operative to: check a throttling status of a micro-operation scheduler at the beginning of the third code path; when the micro-operation scheduler is throttling, continue execution of the micro-operations of the second length; and when the micro-operation scheduler is not throttling, continue execution of the micro-operations of the third length.

In Example 13, in the subject matter of any of Examples 11-12, the microcode is further operative to: program a jump-table register to point to the first code path with a first execution loop of the first length when the first code path is selected; program the jump-table register to point to the second code path with a second execution loop of the second length when the second code path is selected; and program the jump-table register to point to the third code path with a third execution loop of the third length when the third code path is selected.

In Example 14, in the subject matter of any of Examples 11-13, the microcode is further operative to map a power level indication of the LPG hardware to a first zero-penalty, mode-based-branch micro-operation that allows execution of the current string operation using the micro-operations of the first length in the first code path until the second power-up sequence completes and then continue the execution of the current string operation using the micro-operations of the third length in the third code path.

In Example 15, in the subject matter of any of Examples 11-14, the microcode is further operative to map a current-supply license indication to a second zero-penalty, mode-based-branch micro-operation that allows execution of the current string operation using the micro-operations of the second length in the second code path.

Various embodiments may have different combinations of the structural features described above. For instance, all optional features of the computing system described above may also be implemented with respect to the method or process described herein and specifics in the examples may be used anywhere in one or more embodiments.

In Example 16, a method comprises: monitoring, by microcode executed by a processor, a current status of a locally-gated circuitry of a core of the processor, wherein the locally-gated circuitry is power gated by local power gate (LPG) hardware; selecting a first code path of a plurality of code paths for execution when the current status allows execution of micro-operations of a first length only and a current string operation is shorter in length than a pre-defined threshold; selecting a second code path of the plurality of code paths for execution when the current status allows execution of the micro-operations of a second length only and the current string operation is shorter in length than the pre-defined threshold; selecting a third code path of the plurality of code paths for execution of the micro-operations of a third length when the current string operation is longer in length than the pre-defined threshold; at a beginning of the first code path, a) initiating a first power-up sequence by the LPG hardware to power up the locally-gated circuitry for execution of the micro-operations of the second length, and b) continuing execution of the micro-operations of the first length without waiting for the first power-up sequence to complete; and at a beginning of the third code path, c) initiating a second power-up sequence by the LPG hardware to power up the locally-gated circuitry for execution of the micro-operations of the third length, and d) continuing execution of the micro-operations of at least the first length or the second length without waiting for the second power-up sequence to complete.

In Example 17, the subject matter of Example 16, the method further comprises: checking a throttling status of a micro-operation scheduler at the beginning of the third code path; when the micro-operation scheduler is throttling, continuing execution of the micro-operations of the second length; and when the micro-operation scheduler is not throttling, continuing execution of the micro-operations of the third length.

In Example 18, the subject matter of any of Examples 16-17, the method further comprises: programing a jump-table register to point to the first code path with a first execution loop of the first length when the first code path is selected; programing the jump-table register to point to the second code path with a second execution loop of the second length when the second code path is selected; and programing the jump-table register to point to the third code path with a third execution loop of the third length when the third code path is selected.

In Example 19, the subject matter of any of Examples 16-18, the method further comprises: mapping a power level indication of the LPG hardware to a first zero-penalty, mode-based-branch micro-operation that allows execution of the first power-aware operation using the micro-operations of the first length in the first code path until the second power-up sequence completes; and continuing the execution of the current string operation using the micro-operations of the third length in the third code path.

In Example 20, the subject matter of any of Examples 16-19, the method further comprises mapping a current-supply license indication to a second zero-penalty, mode-based-branch micro-operation that allows execution of the current string operation using the micro-operations of the second length in the second code path.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 21 is a non-transitory, computer-readable storage medium including instructions that, when executed by a processor, cause the processor to perform the method of Examples 15-20.

Various embodiments may have different combinations of the operational features described above. For instance, all optional features of the apparatuses and methods described above may also be implemented with respect to a System on Chip (SoC). Specifics in the examples may be used anywhere in one or more embodiments.

Example 22 is a System on Chip (SoC) comprises a plurality of functional units; and local power gate (LPG) hardware coupled to a first functional unit and a second functional unit of the plurality of functional units, the LPG hardware to power gate the first functional unit according to local power states of the LPG hardware monitored by the second functional unit, wherein the second functional unit is operative to decode a first instruction of a set of instructions to perform a first power-aware operation of a specified length, the first instruction to compute an execution code path for execution, wherein the second functional unit is operative to: execute a first micro-operation to monitor a current local power state of the LPG hardware; execute a second micro-operation to select one of a plurality of code paths based on the current local power state, the specified length, and a specified threshold; and execute a third micro-operation in the selected one of the plurality of code paths to issue a hint to the LPG hardware to power up the locally-gated circuitry and to continue execution of the first power-aware operation without waiting for the locally-gated circuitry to be powered up.

In Example 23, the subject matter of Example 22, the second micro-operation is operative to: program a jump-table register to point to a first-length code path of the plurality of code paths when the current local power state allows execution of micro-operations of the first length and the specified length is shorter than the specified threshold; program the jump-table register to point to a second-length code path of the plurality of code paths when the current local power state allows execution of the micro-operations of the second length and the specified length is shorter than the specified threshold, the second length being greater than the first length; and program the jump-table register to point to a third-length code path of the plurality of code paths when the specified length is longer than the specified threshold, the third length being greater than the second length, wherein the first micro-operation is further operative to map a power level indication of the current lower power state to a first mode-based-branch micro-operation that allows execution in the first-code path until the locally-gated circuitry is powered up and then continue the execution in the third-length code path.

In Example 24, the subject matter of 22-23, when the first-length code path is selected, the second functional unit is further operative to: execute the third micro-operation at a beginning of the first-length code path to initiate a power-up sequence by the LPG hardware to power up the first functional unit to execute a second set of subsequent micro-operations of the second length in the second-length code path; and without waiting for the power-up sequence to complete, execute a first set of subsequent micro-operations of the first length in the second-length code path.

In Example 25, the subject matter of 22-24, the second functional unit is further operative to execute the second set of subsequent micro-operations of the second length in the second-length code path when the power-up sequence is completed.

In Example 26, the subject matter of 22-25, when the second-length code path is selected, the second functional unit is further operative to execute subsequent micro-operations of the second length in the second-length code path.

In Example 27, the subject matter of 22-26, when the third-length code path is selected, the second functional unit is further operative to: execute the third micro-operation at a beginning of the third-length code path to initiate a power-up sequence by the LPG hardware to power up the first functional unit to execute a second set of subsequent micro-operations of the third length in the third-length code path; and without waiting for the power-up sequence to complete, execute a first set of subsequent micro-operations of the first length in the third-length code path.

In Example 28, the subject matter of 22-27, the second functional unit is further operative to execute the second set of subsequent micro-operations of the third length in the third-length code path when the power-up sequence is completed.

In Example 29, the subject matter of 22-28, when the third-length code path is selected, the second functional unit is further operative to: execute the third micro-operation at a beginning of the third-length code path to initiate a power-up sequence by the LPG hardware to power up the first functional unit to execute a second set of subsequent micro-operations of the third length in the third-length code path; execute a fourth micro-operation to check for an insufficient current supply license in which a micro-operation scheduler throttles execution by dispatching the micro-operations at a specified clock cycle instead of every clock cycle, wherein the first micro-operation is further operative to map a current-supply license indication to a second mode-based-branch micro-operation that allows execution of the first power-aware operation in the second-length loop when there is insufficient current supply license and allows execution of the first power-aware operation in the third-length loop when there is sufficient current supply license; when there is insufficient current supply license, execute the first set of subsequent micro-operations of the second length in the second-length code path; and execute the second set of subsequent micro-operations of the third length in the third-length code path when the power-up sequence is completed.

In Example 30, the subject matter of 22-29, the first power-aware operation is a repeat (REP) string operation, wherein the first-length code path is a 16-byte code path, the second-length code path is a 32-byte code path, and the third-length code path is a 64-byte code path.

In Example 31, the subject matter of 22-30, the decode unit is operative to decode a second instruction of the set of instructions to compute an early tail condition, wherein the second functional unit is further operative to: execute a sixth micro-operation to compute the early tail condition based on the second instruction; and execute the second micro-operation to select one of the plurality of code paths when there is no early tail in view of the early tail condition; and not execute the second micro-operation when there is an early tail in the view of the early tail condition.

Various embodiments may have different combinations of the operational features described above. For instance, all optional features of the SoC, processor and methods described above may also be implemented with respect to an apparatus. Specifics in the examples may be used anywhere in one or more embodiments.

Example 32 is an apparatus comprising: locally-gated circuitry of a core; local power gate (LPG) hardware coupled to the locally-gated circuitry and the main core circuitry, the LPG hardware to power gate the locally-gated circuitry according to local power states of the LPG hardware; means for monitoring a current status of a locally-gated circuitry of a core of the processor, wherein the locally-gated circuitry is power gated by local power gate (LPG) hardware; means for selecting a first code path of a plurality of code paths for execution when the current status allows execution of micro-operations of a first length only and a current string operation is shorter in length than a pre-defined threshold; means for selecting a second code path of the plurality of code paths for execution when the current status allows execution of the micro-operations of a second length only and the current string operation is shorter in length than the pre-defined threshold; means for selecting a third code path of the plurality of code paths for execution of the micro-operations of a third length when the current string operation is longer in length than the pre-defined threshold; at a beginning of the first code path, means for initiating a first power-up sequence by the LPG hardware to power up the locally-gated circuitry for execution of the micro-operations of the second length, and means for continuing execution of the micro-operations of the first length without waiting for the first power-up sequence to complete; and at a beginning of the third code path, means for initiating a second power-up sequence by the LPG hardware to power up the locally-gated circuitry for execution of the micro-operations of the third length, and means for continuing execution of the micro-operations of at least the first length or the second length without waiting for the second power-up sequence to complete.

In Example 33, the subject matter of Example 32, further comprising: means for checking a throttling status of a micro-operation scheduler at the beginning of the third code path; when the micro-operation scheduler is throttling, means for continuing execution of the micro-operations of the second length; and when the micro-operation scheduler is not throttling, means for continuing execution of the micro-operations of the third length.

In Example 34, the subject matter of Examples 32-33, further comprising: means for programing a jump-table register to point to the first code path with a first execution loop of the first length when the first code path is selected; means for programing the jump-table register to point to the second code path with a second execution loop of the second length when the second code path is selected; and means for programing the jump-table register to point to the third code path with a third execution loop of the third length when the third code path is selected.

In Example 35, the subject matter of Examples 32-33, further comprising: means for mapping a power level indication of the LPG hardware to a first zero-penalty, mode-based-branch micro-operation that allows execution of the first power-aware operation using the micro-operations of the first length in the first code path until the second power-up sequence completes; and means for continuing the execution of the current string operation using the micro-operations of the third length in the third code path.

In Example 36, the subject matter of Examples 32-35, further comprising: means for mapping a current-supply license indication to a second zero-penalty, mode-based-branch micro-operation that allows execution of the current string operation using the micro-operations of the second length in the second code path.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processor comprising:
   locally-gated circuitry of a core;
   main core circuitry of the core, the main core comprising a decode unit and an execution unit; and
   local power gate (LPG) hardware coupled to the locally-gated circuitry and the main core circuitry, the LPG hardware to power gate the locally-gated circuitry according to local power states of the LPG hardware,
   wherein the decode unit is to decode a first instruction of a set of instructions to perform a first power-aware operation of a specified length, the first instruction to compute an execution code path for execution, and
   wherein the execution unit is to:
      execute a first micro-operation to monitor a current local power state of the LPG hardware;
      execute a second micro-operation to select one of a plurality of code paths based on the current local power state, the specified length, and a specified threshold; and
      execute a third micro-operation in the selected one of the plurality of code paths to issue a hint to the LPG hardware to power up the locally-gated circuitry and to continue execution of the first power-aware operation without waiting for the locally-gated circuitry to be powered up.

2. The processor of claim 1, wherein the second micro-operation is operative to:
   program a jump-table register to point to a first-length code path of the plurality of code paths when the current local power state allows execution of micro-operations of the first length and the specified length is shorter than the specified threshold;
   program the jump-table register to point to a second-length code path of the plurality of code paths when the current local power state allows execution of the micro-operations of the second length and the specified length is shorter than the specified threshold, the second length being greater than the first length; and
   program the jump-table register to point to a third-length code path of the plurality of code paths when the specified length is longer than the specified threshold, the third length being greater than the second length, wherein the first micro-operation is further operative to map a power level indication of the current lower power state to a first mode-based-branch micro-operation that allows execution in the first-length code path until the locally-gated circuitry is powered up and then continue the execution in the third-length code path.

3. The processor of claim 2, wherein, when the first-length code path is selected, the execution unit is further operative to:

execute the third micro-operation at a beginning of the first-length code path to initiate a power-up sequence by the LPG hardware to power up the locally-gated circuitry to execute a second set of subsequent micro-operations of the second length in the second-length code path; and without waiting for the power-up sequence to complete, execute a first set of subsequent micro-operations of the first length in the second-length code path.

4. The processor of claim 3, wherein the execution unit is further operative to execute the second set of subsequent micro-operations of the second length in the second-length code path when the power-up sequence is completed.

5. The processor of claim 2, wherein, when the second-length code path is selected, the execution unit is further operative to execute subsequent micro-operations of the second length in the second-length code path.

6. The processor of claim 2, wherein, when the third-length code path is selected, the execution unit is further operative to:

execute the third micro-operation at a beginning of the third-length code path to initiate a power-up sequence by the LPG hardware to power up the locally-gated circuitry to execute a second set of subsequent micro-operations of the third length in the third-length code path; and without waiting for the power-up sequence to complete, execute a first set of subsequent micro-operations of the first length in the third-length code path.

7. The processor of claim 6, wherein the execution unit is further to execute the second set of subsequent micro-operations of the third length in the third-length code path when the power-up sequence is completed.

8. The processor of claim 2, wherein, when the third-length code path is selected, the execution unit is further to:

execute the third micro-operation at a beginning of the third-length code path to initiate a power-up sequence by the LPG hardware to power up the locally-gated circuitry to execute a second set of subsequent micro-operations of the third length in the third-length code path;

execute a fourth micro-operation to check for an insufficient current supply license in which a micro-operation scheduler throttles execution by dispatching the micro-operations at a specified clock cycle instead of every clock cycle, wherein the first micro-operation is further to map a current-supply license indication to a second mode-based-branch micro-operation that allows execution of the first power-aware operation in the second-length code path when there is insufficient current supply license and allows execution of the first power-aware operation in the third-length code path when there is sufficient current supply license;

when there is insufficient current supply license, execute a first set of subsequent micro-operations of the second length in the second-length code path; and execute the second set of subsequent micro-operations of the third length in the third-length code path when the power-up sequence is completed.

9. The processor of claim 1, wherein the first power-aware operation is a repeat (REP) string operation, wherein the first-length code path is a 16-byte code path, the second-length code path is a 32-byte code path, and the third-length code path is a 64-byte code path.

10. The processor of claim 1, wherein the decode unit is to decode a second instruction of the set of instructions to compute an early tail condition, wherein the execution unit is further to:

execute a sixth micro-operation to compute the early tail condition based on the second instruction; and execute the second micro-operation to select one of the plurality of code paths when there is no early tail in view of the early tail condition; and not execute the second micro-operation when there is an early tail in the view of the early tail condition.

11. A processor comprising:

a microcode store of a core, the microcode store to store microcode;

local power gate (LPG) hardware coupled to locally-gated circuitry of the core; and main core circuitry of the core, wherein the core is to execute the microcode to:

monitor a current status of the locally-gated circuitry;

select a first code path of a plurality of code paths for execution when the current status allows execution of micro-operations of a first length only and a current string operation is shorter in length than a pre-defined threshold;

select a second code path of the plurality of code paths for execution when the current status allows execution of the micro-operations of a second length only and the current string operation is shorter in length than the pre-defined threshold;

select a third code path of the plurality of code paths for execution of the micro-operations of a third length when the current string operation is longer in length than the pre-defined threshold;

at a beginning of the first code path, initiate a first power-up sequence by the LPG hardware to power up the locally-gated circuitry for execution of the micro-operations of the second length and continue execution of the micro-operations of the first length without waiting for the first power-up sequence to complete; and at a beginning of the third code path, initiate a second power-up sequence by the LPG hardware to power up the locally-gated circuitry for execution of the micro-operations of the third length and continue execution of the micro-operations of at least the first length or the second length without waiting for the second power-up sequence to complete.

12. The processor of claim 11, wherein the microcode is further operative to:

check a throttling status of a micro-operation scheduler at the beginning of the third code path;

when the micro-operation scheduler is throttling, continue execution of the micro-operations of the second length; and when the micro-operation scheduler is not throttling, continue execution of the micro-operations of the third length.

13. The processor of claim 11, wherein the microcode is further operative to:

program a jump-table register to point to the first code path with a first execution loop of the first length when the first code path is selected;

program the jump-table register to point to the second code path with a second execution loop of the second length when the second code path is selected; and program the jump-table register to point to the third code path with a third execution loop of the third length when the third code path is selected.

14. The processor of claim 11, wherein the microcode is further operative to map a power level indication of the LPG hardware to a first zero-penalty, mode-based-branch micro-operation that allows execution of the current string operation using the micro-operations of the first length in the first code path until the second power-up sequence completes and then continue the execution of the current string operation using the micro-operations of the third length in the third code path.

15. The processor of claim 14, wherein the microcode is further operative to map a current-supply license indication to a second zero-penalty, mode-based-branch micro-operation that allows execution of the current string operation using the micro-operations of the second length in the second code path.

16. A method comprising:
monitoring, by microcode executed by a processor, a current status of a locally-gated circuitry of a core of the processor, wherein the locally-gated circuitry is power gated by local power gate (LPG) hardware;
selecting a first code path of a plurality of code paths for execution when the current status allows execution of micro-operations of a first length only and a current string operation is shorter in length than a pre-defined threshold;
selecting a second code path of the plurality of code paths for execution when the current status allows execution of the micro-operations of a second length only and the current string operation is shorter in length than the pre-defined threshold;
selecting a third code path of the plurality of code paths for execution of the micro-operations of a third length when the current string operation is longer in length than the pre-defined threshold;
at a beginning of the first code path,
  initiating a first power-up sequence by the LPG hardware to power up the locally-gated circuitry for execution of the micro-operations of the second length, and
  continuing execution of the micro-operations of the first length without waiting for the first power-up sequence to complete; and
at a beginning of the third code path,
  initiating a second power-up sequence by the LPG hardware to power up the locally-gated circuitry for execution of the micro-operations of the third length, and
  continuing execution of the micro-operations of at least the first length or the second length without waiting for the second power-up sequence to complete.

17. The method of claim 16, further comprising:
checking a throttling status of a micro-operation scheduler at the beginning of the third code path;
when the micro-operation scheduler is throttling, continuing execution of the micro-operations of the second length; and
when the micro-operation scheduler is not throttling, continuing execution of the micro-operations of the third length.

18. The method of claim 16, further comprising:
programing a jump-table register to point to the first code path with a first execution loop of the first length when the first code path is selected;
programing the jump-table register to point to the second code path with a second execution loop of the second length when the second code path is selected; and
programing the jump-table register to point to the third code path with a third execution loop of the third length when the third code path is selected.

19. The method of claim 16, further comprising:
mapping a power level indication of the LPG hardware to a first zero-penalty, mode-based-branch micro-operation that allows execution of a first power-aware operation using the micro-operations of the first length in the first code path until the second power-up sequence completes; and
continuing the execution of the current string operation using the micro-operations of the third length in the third code path.

20. The method of claim 19, further comprising mapping a current-supply license indication to a second zero-penalty, mode-based-branch micro-operation that allows execution of the current string operation using the micro-operations of the second length in the second code path.

* * * * *